(12) United States Patent
Liu

(10) Patent No.: US 10,874,584 B2
(45) Date of Patent: Dec. 29, 2020

(54) POOL PUMP

(71) Applicant: BESTWAY INFLATABLES & MATERIAL CORP., Shanghai (CN)

(72) Inventor: Feng Liu, Shanghai (CN)

(73) Assignee: BESTWAY INFLATABLES & MATERIAL CORP., Shanghai (CN)

( * ) Notice: Subject to any disclaimer, the term of this patent is extended or adjusted under 35 U.S.C. 154(b) by 657 days.

(21) Appl. No.: 15/474,750

(22) Filed: Mar. 30, 2017

(65) Prior Publication Data
US 2017/0216138 A1 Aug. 3, 2017

Related U.S. Application Data

(63) Continuation of application No. 15/205,286, filed on Jul. 8, 2016, now Pat. No. 10,660,819.

(30) Foreign Application Priority Data

Jul. 16, 2015 (CN) ...................... 2015 2 0516905 U
Sep. 21, 2015 (CN) ...................... 2015 2 0730298 U
Dec. 7, 2015 (CN) ...................... 2015 2 1007886 U

(51) Int. Cl.
*E04H 4/12* (2006.01)
*A61H 33/00* (2006.01)
(Continued)

(52) U.S. Cl.
CPC ....... *A61H 33/005* (2013.01); *A61H 33/0087* (2013.01); *A61H 33/0095* (2013.01);
(Continued)

(58) Field of Classification Search
CPC .............. A61H 33/005; A61H 33/0087; A61H 33/0095; A61H 33/6005; E04H 4/1245; G06F 3/044
(Continued)

(56) References Cited

U.S. PATENT DOCUMENTS 6,146,108 A 11/2000 Mullendore
2007/0154323 A1* 7/2007 Stiles, Jr. ............ F04D 15/0077
417/44.1

(Continued)

FOREIGN PATENT DOCUMENTS

WO      2008022883        2/2008
WO   WO 2008/022883 A1   2/2008
WO      2013020180        2/2013

OTHER PUBLICATIONS

European Search Report issued in European Application No. 16179046.4 dated May 19, 2017 (8 pages).

*Primary Examiner* — Huyen D Le
(74) *Attorney, Agent, or Firm* — AJ Moss; Dickinson Wright PLLC

(57) ABSTRACT

A pool pump is provided. The pool pump comprises a housing, and a control panel arranged on said housing, with a control unit connected to said control panel to form a capacitive touch control. The housing may be provided with at least one accommodation cavity, the control panel is arranged in a flippable manner at said housing, and the control panel and the end cover are in a horizontal position and at least one preset angle position. The pool pump is detachably connected to a pool pump cover, and the pool pump cover comprises: a cover body; a base connected to said cover body; and at least one functional device arranged on said cover body for implementing at least one of the functions of communication, electrical charging and music play. The pool pump adopts a pool control system for a massage pool unit of an inflatable pool, comprising an intelligent controller electrically connected to the massage pool unit, and the intelligent controller is configured to receive a usage operation to drive said pool pump so that said inflatable pool generates multiple water circulation modes.

23 Claims, 23 Drawing Sheets

(51) Int. Cl.
*G06F 3/044* (2006.01)
*E04H 4/00* (2006.01)

(52) U.S. Cl.
CPC ....... *A61H 33/6005* (2013.01); *E04H 4/1245* (2013.01); *G06F 3/044* (2013.01); *A61H 2033/007* (2013.01); *A61H 2033/0058* (2013.01); *A61H 2033/0083* (2013.01); *A61H 2201/0103* (2013.01); *A61H 2201/0111* (2013.01); *A61H 2201/0207* (2013.01); *A61H 2201/50* (2013.01); *A61H 2201/5046* (2013.01); *A61H 2201/5048* (2013.01); *A61H 2201/5097* (2013.01); *E04H 4/0025* (2013.01)

(58) Field of Classification Search
USPC .......................................................... 4/541.3
See application file for complete search history.

(56) References Cited

U.S. PATENT DOCUMENTS

| | | | |
|---|---|---|---|
| 2009/0269217 A1* | 10/2009 | Vijayakumar | F04B 17/06 |
| | | | 417/234 |
| 2010/0092308 A1 | 4/2010 | Stiles, Jr. et al. | |
| 2011/0182754 A1 | 7/2011 | Gathers et al. | |
| 2011/0280744 A1 | 11/2011 | Ortiz et al. | |
| 2013/0106322 A1 | 5/2013 | Drye | |
| 2013/0129536 A1* | 5/2013 | Robol | F04B 19/00 |
| | | | 417/410.1 |
| 2014/0018961 A1* | 1/2014 | Guzelgunler | F04B 49/065 |
| | | | 700/275 |
| 2015/0196456 A1 | 7/2015 | Nicholson | |

\* cited by examiner

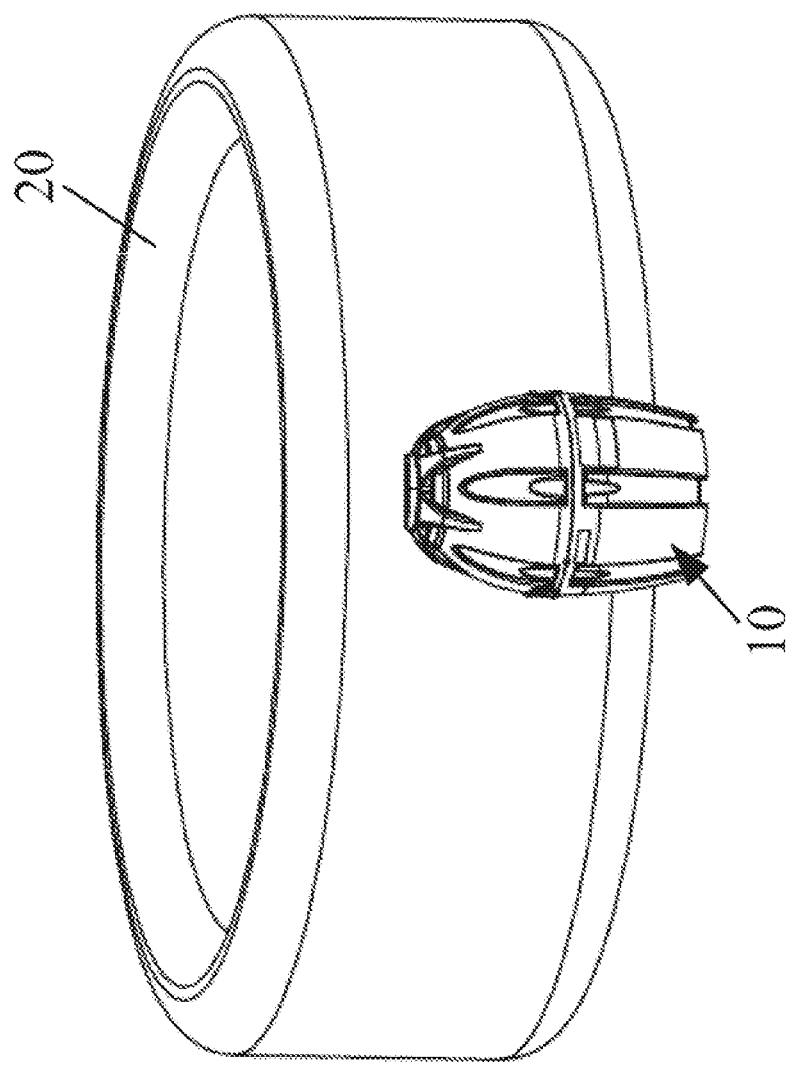

POOL PUMP

CROSS REFERENCE

This application is a continued application of U.S. patent application Ser. No. 15/205,286 filed on Jul. 8, 2016 and claims priority to Chinese Application No. 201520516905.4, filed Jul. 16, 2015, Chinese Application No. 201521007886.9, filed Dec. 7, 2015, and Chinese Application No. 201520730298.1, filed Sep. 21, 2015. The entire disclosures of each of the above applications are incorporated herein by reference.

FIELD OF THE INVENTION

The present invention relates to pool pumps, specifically to a pool pump for an inflatable pool, and more specifically to a pool pump cover for use on the pool pump.

BACKGROUND

With increasingly fast life pace of modern society, SPA has become an effective way to relieve physical and mental fatigue and treat diseases. It can achieve the purpose of feeling comfortable by means of water massage on the body. The most commonly used pool equipment has functions such as strong massage, bubble flushing, constant temperature bath and circulating disinfection. To this end, the pool is generally provided with a pump for providing water flow and controlling the pressure, temperature and buoyancy of water. However, in the prior art, pumps used for the pool are all operated by a mechanical control panel structure. Such a mechanical control panel structure is provided with mechanical keys, so that it has a short lifetime, and water can easily enter the interior of the circuit board through the mechanical key holes, resulting in failure of the keys. Furthermore, the control panel of the inflatable pool is arranged in two ways: either the control panel is integrally arranged with the pool pump and fixed to the pump body in a planar manner, so that a user cannot observe the operation state of the inflatable pool in time during the use of the inflatable pool, and thus cannot control the pool immediately; or control panel is split from the pool pump, so that the user needs to manually mount the control panel on the inflatable pool, which is complicated in operation, Aiming at these problems, there is an urgent need to provide a new pool pump to solve the problems in the prior art of inconvenience in use and incapability of checking the operation state of the inflatable pool.

Moreover, the use of the pool pump requires many auxiliary facilities, for example, an inflating device or a wire plug device, to improve the ease of use, such as storing personal clothing or belonging and conveniently moving the pool pump, etc. However, the commercially available pool pumps do not provide a special receiving space or a related device, and have inconveniences. Furthermore, in a SPA process of a long duration, it is desired to satisfy multifunctional needs at the same time, such as the enjoyment in the sense of taste or hearing. At present, the commercially available pool pumps cannot meet people's multiple needs.

Finally, the inflatable pool devices commonly used at present have conventional functions of strong massage, bubble flushing, constant temperature bath and circulating sterilization, which cannot meet the people's requirements of further control functions, such as power and energy saving and electric leakage protection and thus cannot achieve the diversity in use. In the prior art, SPA pools are generally used for physical therapy, relaxation and leisure to achieve a relaxing effect, and are highly popular.

SUMMARY

In order to overcome the defects of the conventional pool pump, such as short lifetime of mechanical key control panel and non-waterproofing, the present invention provides a pool pump using a pool pump using a capacitive touch control panel. The present invention further provides a pool pump which has a separate accommodation cavity for ease of use and in which the control panel is arranged in a flippable manner to facilitate a user to observe the operation state of the inflatable pool and make an adjustment in time. Furthermore, in order to overcome the defects, i.e., being unable to meet the multiple needs of people and being inconvenient in use, of the pool in the prior art, provided is a pool pump cover integrating a receiving device and an audio device. Finally, the present invention further discloses a pool control system which uses an intelligent controller to control several functional devices so as to achieve the diversity in use.

The above-mentioned technical problems are solved according to the present invention by the following technical solution: a pool pump, comprising a housing, including an end cover arranged at an upper part of said housing; and a control panel arranged on said housing, with a control unit connected to said control panel to form a capacitive touch control, wherein a plurality of recesses are provided on an inner side surface of said control panel, a plurality of electrically conductive components are arranged on said control unit, and said electrically conductive component is arranged in said recess, and wherein said electrically conductive component is a sensing spring, with one end of said sensing spring connected to said recess correspondingly and the other end thereof connected to said control unit so that said control panel forms said capacitive touch control.

Preferably said control panel and said control unit are arranged on said end cover and integrally formed with said housing to form a waterproof sealed structure, and wherein the inner side surface of said end cover has an accommodation space, said control unit comprises a package housing, said control unit is fixedly connected to said end cover through said package housing and accommodated in said accommodation space to form an enclosed body and a seal ring is arranged at the junction of said control unit and said end cover.

Preferably, said housing is provided with at least one accommodation cavity said control panel is arranged in a flippable manner on said housing, said control panel and said end cover are in a horizontal position and at least one preset angle position, said accommodation cavity comprises an opening, and at least one cover body is arranged in a flippable manner on said housing through at least one linkage and located at the front side, the rear side or both sides of said opening.

Preferably, said control panel comprises a first housing cover and a second housing cover, and said control unit is accommodated between said first housing cover and said second housing cover.

Preferably, said first housing cover is provided with a display window, and at least one display component is arranged on said control unit and exposed through said display window.

Preferably, said second housing cover is provided with at least one notch and an accommodation groove, said notch is located at an edge of one end of said second housing cover, and said accommodation groove is located at an edge of the other end of said second housing cover.

Preferably, said control panel is provided with a clamping slot located at a lower bottom of said control panel, and a linkage rod arranged at said housing, said linkage rod is accommodated in said accommodation groove when the control panel is in said horizontal position, and said linkage rod is engaged in said clamping slot when the control panel is in said preset angle position.

Preferably further comprised are a port and at least one elastic body, said port is arranged in said housing, said elastic body is sheathed on said linkage rod, and said elastic body and said linkage rod are arranged in said port.

Preferably, said linkage rod comprises a first inclined surface and a second inclined surface, said clamping slot forms a first engagement surface on said first housing cover, and forms a second engagement surface on said second housing cover, said first inclined surface and said second inclined surface are respectively in contact engagement with said first engagement surface and said second engagement surface.

Preferably, said control panel comprises at least one rotary shaft assembly, and said control panel is arranged in a flippable manner on said housing through said rotary shaft assembly.

Preferably, said end cover is provided with a recessed portion, and said control panel is adhered to said end cover when said control panel is in said horizontal position and is accommodated in said recessed portion.

Preferably, a recess is provided on an outer surface of said cover body and a flange is provided on an upper surface of said recess.

Preferably, an inner surface of said cover body is provided with a snap-fit member located on a lower surface of said recess, and an engagement groove arranged in said accommodation cavity, and said cover body is engaged with said engagement groove through said snap-fit member and covers said accommodation cavity.

Preferably, said snap-fit member comprises a movable rod, said movable rod is sheathed with an elastic member, and said movable rod and said elastic member are accommodated in a mounting base and mounted on said cover body.

Preferably, said pool pump further comprises a pull rod assembly installed on a side edge of said housing, and a roller assembly installed at the bottom of said housing.

The present invention further provides a pool pump cover, characterized in that said pool pump cover detachably connected a pool pump comprises: a cover body which at least partially covers said pool pump; a base connected to said cover body and forming a hollow cavity together with said cover body for placing said pool pump; and at least one functional device arranged on said cover body for implementing at least one of functions of communication, electrical charging and music play.

Preferably, said base comprises a first support portion and a second support portion, and said first support portion and said second support portion are symmetrically arranged and respectively detachably connected to said cover body through a connector.

Preferably, said first snap-fit member is arranged on said first support portion, said second snap-fit member is arranged on said cover body, and said first snap-fit member is connected to said second snap-fit member correspondingly so as to connect said cover body and said first support portion as a whole; and said third snap-fit member is arranged on said second support portion, said fourth snap-fit member is arranged on said cover body, and said third snap-fit member is connected to said fourth snap-fit member correspondingly so as to connect said cover body and said second support portion as a whole.

Preferably, said first support portion is provided with a first connecting portion extending outwards, said second support portion is provided with a second connecting portion extending outwards, said first connecting portion is detachably connected to said second connecting portion so as to connect said first support portion and said second support portion as a whole.

Preferably, said cover body is provided with a first receiving portion, said functional device is accommodated in said first receiving portion, said cover body is provided with at least one gap for mounting or dismounting said functional device from said first receiving portion, said functional device is configured to have a Bluetooth device to form a communication connection with at least one electronic device so as to receive an audio signal from said electronic device or transmit an external audio signal to said electronic device, and an audio device is arranged on said functional device to receive and play said audio signal and extract said external audio signal.

Preferably, said cover body is provided with at least one second receiving portion, and said second receiving portion has a hollow structure for placing an article.

Preferably, said cover body is provided with a port, and at least one control panel of said pool pump is inserted in said port.

Finally, the present invention provides a pool control system, characterized in that said pool control system for a massage pool unit including a pool pump and an inflatable pool comprises: an intelligent controller which is electrically connected to said massage pool unit and configured to receive a usage operation to drive said pool pump so that said inflatable pool generates multiple water circulation modes, said intelligent controller comprising a capacitive touch control panel configured to receive said usage operation to generate multiple pool pump driving signals; and a central control system which is electrically connected to said capacitive touch control panel and configured to receive said pool pump driving signal to generate a functional device parameter set signal for respectively driving multiple functional devices of said pool pump in one-way transmission, and said functional devices comprises a heating system, a filter system, a massage system, a lamp control system, a sterilization system and a hard water treatment system.

Preferably, said pool control system further comprises a remote APP control system and an electric leakage protection system, said remote APP control system is electrically connected to said central control system and configured for remotely receiving said usage operation, said electric leakage protection system is electrically connected to said central control system and configured for feedback of an electric leakage signal, and said central control system interrupts operation of said functional device according to said electric leakage signal.

Preferably, said pool control system further comprises a time scheduling system which is electrically connected to said central control system and configured to receive said functional device parameter set signal for timing control of said heating system.

The positive effects of the present invention the following aspects.

The present invention pool pump uses a capacitive touch control panel integrally formed in a touch screen sensing manner, so as to prevent water from entering the circuit board in the panel housing. Furthermore, the pool pump has a separate accommodation cavity for placing auxiliary appliance and the user's personal belongings, which is convenient to use, and the pool pump further comprises a flippable control panel to facilitate the user to observe the operation state of the inflatable pool and make an adjustment in time, which has good user experience and greatly improve the convenience in use. Moreover, in the pool pump cover, the receiving device and the audio device are arranged in the same cover body, which is simple in structure and convenient for installation and can fully meet the multiple needs of people in a physical therapy process. Finally, the pool control system of the present invention achieves the diversity in use, and the electric leakage protection system improves the reliability in use.

BRIEF DESCRIPTION OF THE DRAWINGS

The above-mentioned and other features, properties and advantages of the present invention will become more apparent from the following description of embodiments with reference to the accompany drawings, in which:

FIG. 25 is a structural schematic view of the pool control system provided in FIG. 24 applied to an inflatable pool.

DETAILED DESCRIPTION

The present invention will be further described below in conjunction with detailed embodiments and the accompanying drawings. More details are provided in the following detailed description in order for the present invention to be hilly understood. However, the present invention can be implemented in various ways other than those described herein. A person skilled in the art can make similar analogy and modification according to the practical applications without departing from the spirit of the present invention, and therefore the contents of the detailed embodiments herein should not be construed as limiting to the scope of the present invention.

To make the above objects, features and advantages of the present invention more obvious and easy to understand, the present invention will be further described in detail below in conjunction with the accompanying drawings and particular embodiments.

In the following description, numerous specific details are set forth in order to fully understand the present invention, but the present invention can also be implemented in other ways different from those described herein; therefore, the present invention is not limited to the particular embodiments disclosed hereinafter.

Figure 1:
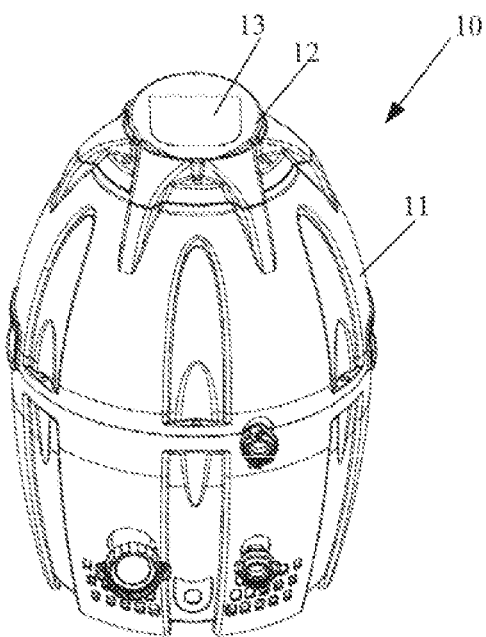
FIG. 1 is a structural schematic view of a pool pump of a first embodiment according to the present invention.
Figure 2:
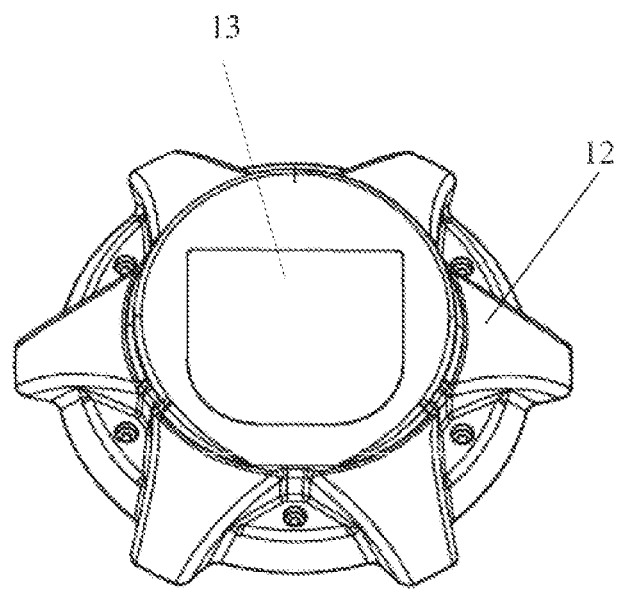
FIG. 2 is a structural schematic view of an end cover of a housing of the pool pump provided in FIG. 1.

As shown in FIGS. 1 and 2, an embodiment of the present invention discloses a pool pump 10, comprising a housing 11 and a control panel 13, wherein the control panel 13 is arranged at an upper part of an end cover 12 of a housing 11, and the control panel 13 is integrally formed with an end cover 12 of the housing 11. Therefore, the control panel 13 and the end cover 12 of the pool pump 10 form a sealed structure completely without a gap and with a flat outer surface. Furthermore, with reference to FIGS. 3 and 4, an inner side surface of the end cover 12 of the housing 11 has an accommodation space, a control unit 14 is arranged inside said accommodation space, and the control unit 14 corresponds to the control panel 13 to form a capacitive touch control connection.

Further, a plurality of recesses 131 are provided on an inner surface of the control panel 13, and a plurality of electrically conductive components are arranged on the control unit 14. Said electrically conductive components are accommodated in the recesses 131, so as to be in contact with the control panel 13 through said electrically conductive components to form a connection between the control panel 13 and the control unit 14, thereby achieving the capacitive touch control effect by using the capacitive sensing generated by touching in use. Said electrically conductive component is preferably a sensing spring 141, with one end of the sensing spring 141 connected to the corresponding recess 131, and the other end thereof connected to the control unit 14.

The pool pump 10 further comprises a seal ring 16, which is arranged at a junction of the control panel 13 where the control unit 14 is connected to the end cover 12, so as to achieve the further sealing effect by installing the control unit 14 on the end cover 12. The control unit 14 herein further comprises a package housing 17, with reference to FIGS. 4 and 5, the package housing 17 is fixedly connected to a cavity in the end cover 12 of the housing 11, so that the control unit 14 is fixedly connected to the end cover 12 through the package housing 17, so as to form an enclosed body. Thus, the control unit 14 can be sealed inside said accommodation space to prevent water from entering therein to damage the control unit 14.

In summary, the present invention pool pump uses a touch screen sensing control panel configuration structure to form an integral design so as to achieve the operation on the control panel and at the same time to have a waterproofing function to avoid water from seeping into the circuit board in the panel housing, thereby improving the lifetime thereof and preventing failure of the keys. In order to, improve the ease of use of the pool pump, the present invention further provides a pool pump, and has a separate accommodation cavity which can be used to place auxiliary means, such as an inflating device or a plug wire device and can also be used to place the user's personal belongings, which is convenient to use. In addition, the control panel is arranged in a flippable manner on the housing, the control panel forms a horizontal position and at least one preset angle position to facilitate the user to observe the operation state of the inflatable pool and make an adjustment in time, which has good user experience.

The pool pump of the second embodiment as shown in FIGS. 6-11 comprises a housing 211 and a control panel 217 arranged on the housing 211. The interior of the housing 11 is divided into two cavities by a partition, one cavity accommodating arrangement pipeline, motors and other devices, and the other cavity being an accommodation cavity 213, and auxiliary means, such as an inflating device and a plug wire device, and the user's personal belongings can be placed in the accommodation cavity 213. Locations of the two cavities are not limited, and can be set according to requirements and the convenience, and in this embodiment, the accommodation cavity 213 is located at an upper part of one side of the housing 211.

The accommodation cavity 213 comprises an opening 2131, and at least one cover body 214 is arranged in a flippable manner on the housing 211 and located on the front or rear side of the opening 2131, and the cover body 214 is used to open and close the opening 2131. In this embodiment, there is one cover body 214. It further comprises at least one linkage 2143 arranged on the housing 211 so that the cover body 214 is arranged in a flippable manner on the housing 11. Preferably, the opening 2131 is arranged at the top of the accommodation cavity 213.

The control panel 217 comprises a first housing cover 2171 and a second housing cover 2172, and the control unit 14 of the control panel 217 is accommodated between the first housing cover 2171 and the second housing cover 2172. The control panel 217 is rotatably connected to the housing 211, and can be at least located in a horizontal position and in a preset angle position relative to the horizontal plane. A plurality of recesses 2131 are provided on an inner surface of the control panel 213, and a plurality of electrically conductive components are arranged on the control unit 14. Said electrically conductive components are accommodated in the recesses 2131, so as to be in contact with the control panel 213 through said electrically conductive components to form a connection between the control panel 213 and the control unit 14, thereby achieving the capacitive touch control effect by using the capacitive sensing generated by touching in use. Said electrically conductive component herein is preferably a sensing spring 2141, with one end of the sensing spring 2141 connected to the corresponding recess 2131, and the other end thereof connected to the control unit 14.

The first housing cover 2171 is provided with a display window 21711, and the control unit 14 will be exposed through the display window 21711. At least one notch 21721 is provided on the second housing cover 2172 and located at an upper end edge of the second housing cover 2172, so that the user can conveniently access into the notch 21721 to turn over the control panel 217.

An accommodation groove 21722 is provided on the second housing cover 2172 and located at the lower end edge of the second housing cover 2172. A damping slot 2173 is provided on the control panel 217 and located at a lower bottom of the control panel 217, and a linkage rod 219 is arranged on the housing 211, wherein the linkage rod 219 is accommodated in an accommodation groove 21722 when the control unit 14 is in a horizontal position, and the linkage rod 219 is engaged in the clamping slot 2173 when the control panel 217 is in a preset angle position.

Preferably, it further comprises a port 2112 provided on the housing 211, at least one elastic body 218 is sheathed on the linkage rod 219, and the elastic body 218 and the linkage rod 219 are arranged in the port 2112. The elastic body 218 is preferably a spring.

Preferably, the linkage rod 219 comprises a first inclined surface 2191 and a second inclined surface 2192, the clamping slot 2173 forms a first engagement surface 21731 on the first housing cover 2171, and forms a second engagement surface 21732 on the second housing cover 2172, and the first inclined surface 2191 and the second inclined surface 2192 are respectively in contact engagement with the first engagement surface 21731 and the second engagement surface 21732.

Preferably, the control panel 217 comprises at least one rotary shaft assembly 2174, and the control unit 14 is arranged in a flippable manner at the housing 211 through a rotary shaft assembly 2174. When the control panel 217 is located at the horizontal position, the upper surface of the control panel 217 is level with the upper surface of the cover body 214, so as to ensure the nice appearance.

Further, a recessed portion 2111 is provided at the top of the housing 211, and the control panel 217 is accommodated in the recessed portion 2111 when in the horizontal position and adhered to the bottom surface of the recessed portion 2111.

A recess 2141 is provided on an outer surface of the cover body 214, and a flange 2142 is provided at an edge of an upper surface of the recess 2141, so that a human hand can conveniently access into the recess 2141 and open the cover body 214 through the flange 2142.

Preferably, a snap-fit member 216 is provided on an inner surface of the cover body 214 and located at a lower surface of the recess 2141, and an engagement groove 215 is arranged in the accommodation cavity 213, and the cover body 214 is in engagement with the engagement groove 215 through the snap-fit member 216 and covers the accommodation cavity 213. Preferably, the engagement groove 215 is arranged on an inner side wall of the top of the accommodation cavity 213.

The snap-fit member 216 comprises a movable rod 2163, the movable rod 2163 is sheathed with an elastic member 2162, and the movable rod 2163 and the elastic member 2162 are accommodated in a mounting base 2161 and mounted on the inner surface. The elastic member 2162 is preferably a spring.

Further, a limit structure is arranged on the movable rod 2163, and is an annular boss 21631 in this embodiment. A through-hole 21611 is provided on the surface of the mounting base 2161 corresponding to the engagement groove 215, the movable rod 2163 penetrates out of the through-hole 21611 under the elastic action of the elastic member 2162, and the annular boss 21631 abuts against an inner wall surface of the mounting base 2161 to limit position of the movable rod 2163. The portion of the movable rod 2163 penetrating out of the mounting base can overcome the elastic force to be engaged into or disengaged from the engagement groove 215 so as to lock or unlock the cover body 214. In order to facilitate the engagement and disengagement of the movable rod 2163, the portion of the movable rod 2163 penetrating out of the through-hole 21611 has a first guide inclined surface 21632 and a second guide inclined surface 21633 for respectively guiding the movable rod 2163 to be engaged into or disengaged from the engagement groove 215.

The snap-fit member is not limited to the above structure, and may be other structures that can conveniently lock and unlock the cover body, and the structure for limiting the control panel to be form in a horizontal position and in at least one preset angle position is also not limited to the above structure, and may be other structures that can limit the control panel to be in different inclined positions, for example, a damper is arranged on the rotary shaft of the control panel.

Figure 12:
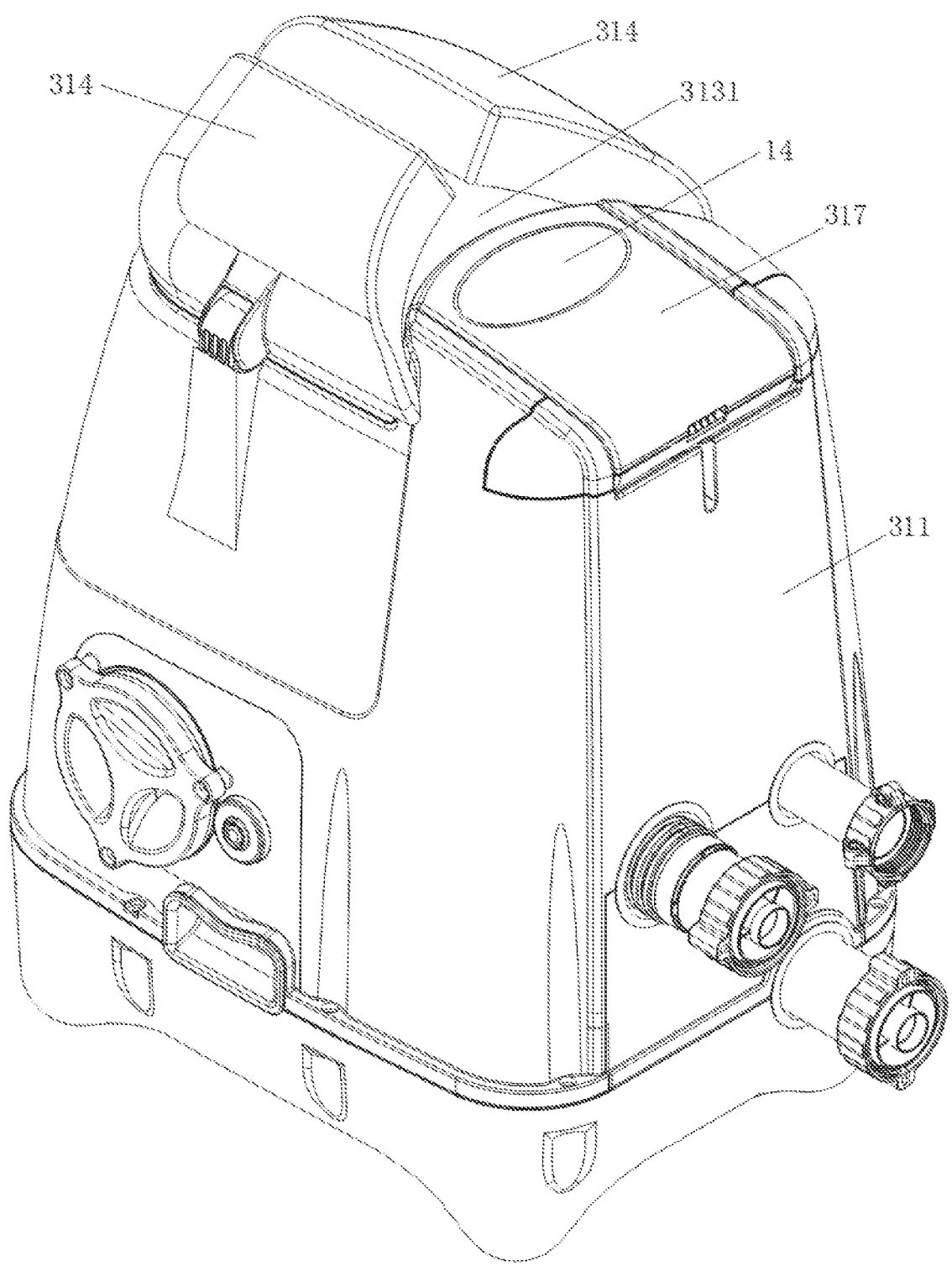
FIG. 12 is a structural schematic view of a pool pump according to a third embodiment of the present invention.

The present invention further provides a pool pump of a third embodiment, with a structure substantially the same as that in the second embodiment, as shown in FIG. 12, comprising a housing 311 and a control panel 317 arranged on the housing 311. The control panel 317 accommodates a control unit 14. The interior of the housing 311 is divided into two cavities by a partition, one cavity accommodating arrangement pipeline, motors and other devices, and the other cavity being an accommodation cavity, and auxiliary means, such as an inflating device and a plug wire device, and the user's personal belongings can be placed in the accommodation cavity. The accommodation cavity comprises an opening 3131, and further comprises a cover body 314 for opening and closing the opening 3131.

The difference lies in that there are two cover bodies 314 in this embodiment, and the two cover bodies 314 are located on two sides of the opening 3131. The two cover bodies 314 can turn over relatively to open the opening 3131.

Figure 13:
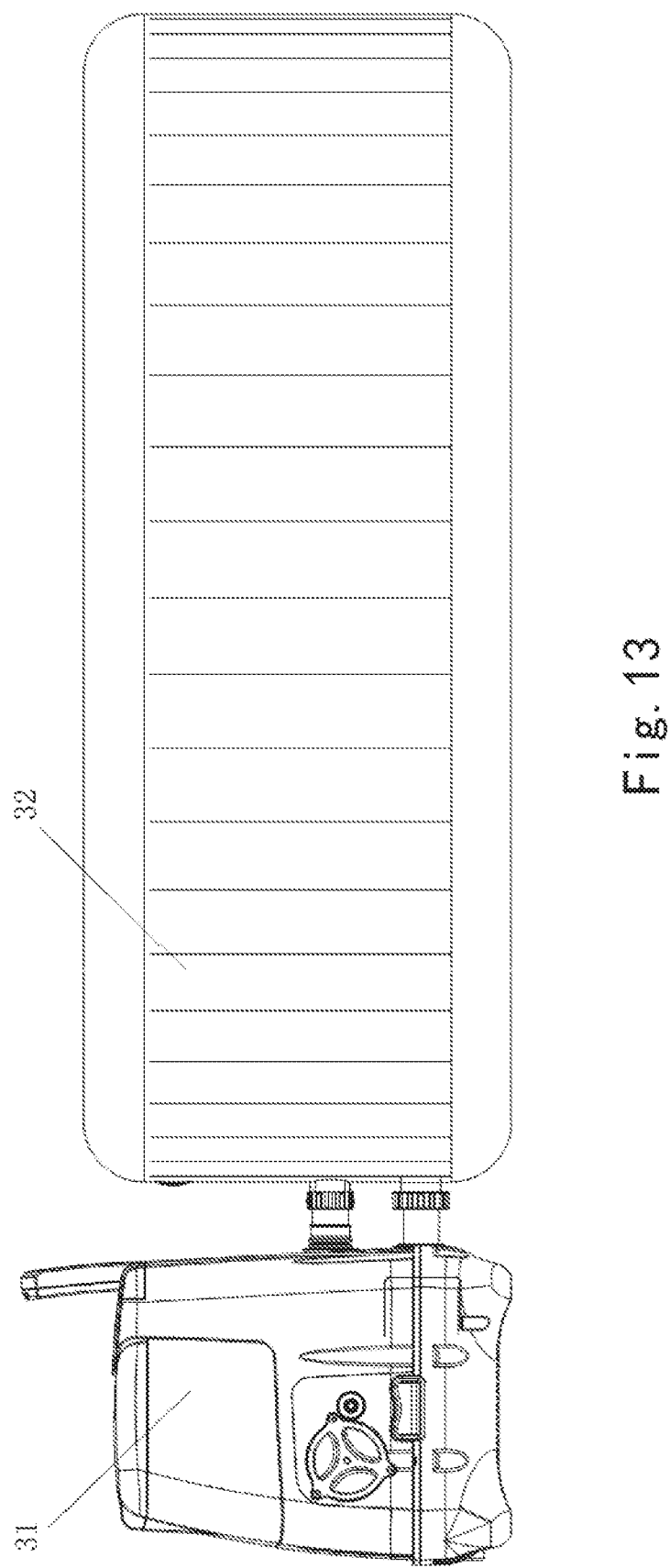
FIG. 13 is a pattern diagram of the pool pump provided in FIG. 6 applied to an inflatable pool.

FIG. 13 is a pattern diagram of the pool pump of the second embodiment of the present invention applied to an inflatable pool, and as shown in the figure, the inflatable pool body 2 of the inflatable pool and the above-mentioned pool pump 1 form an inflatable massage pool circulation system. Further, when the control panel of the pool pump 1 is in a vertical state, the control panel is arranged higher than the inflatable pool body 2, so as to facilitate the user to observe the operation state of the inflatable pool m real time and make an adjustment in time.

Figure 14:
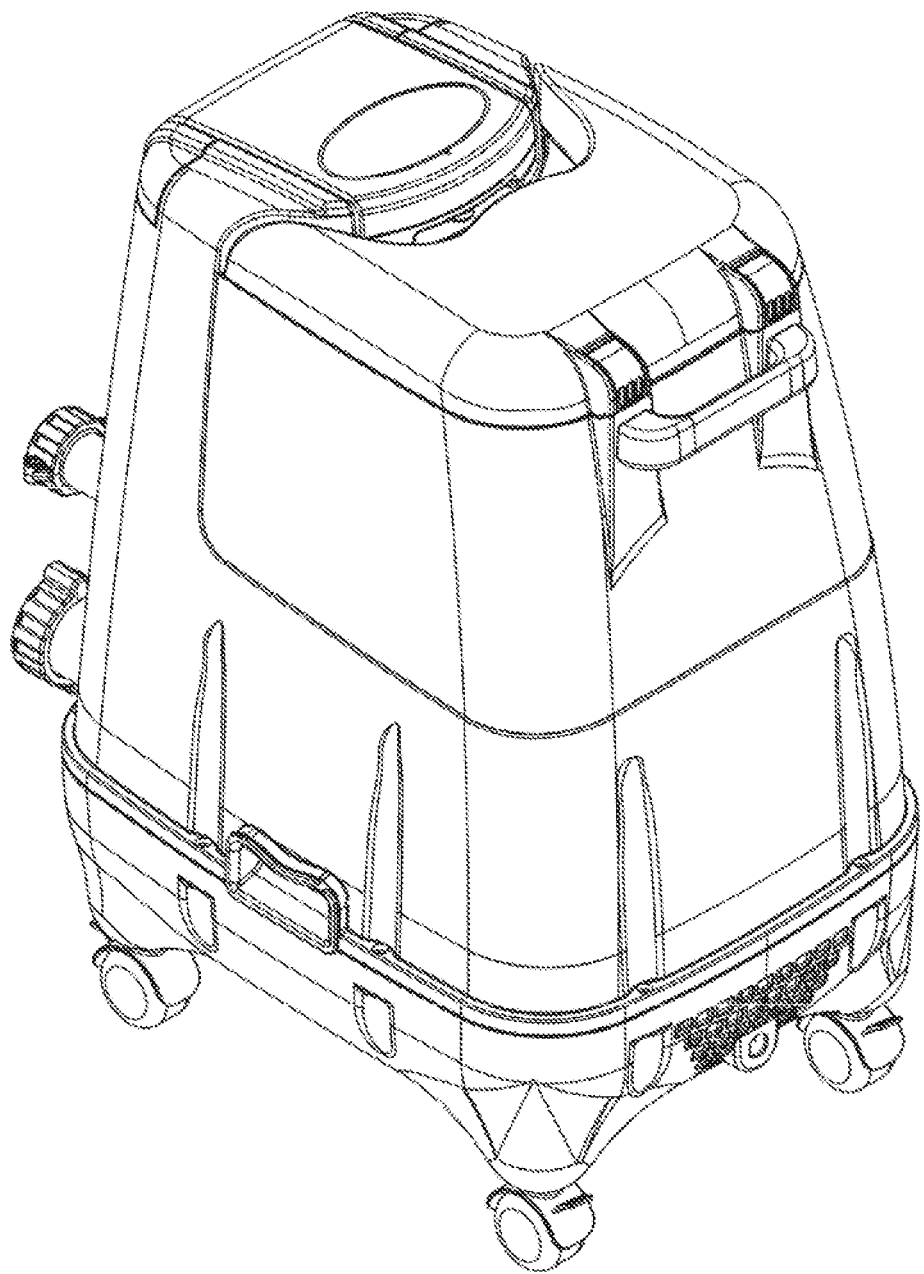
FIG. 14 is a three-dimensional diagram of a pool pump of a fourth embodiment according to the present invention.
Figure 15:
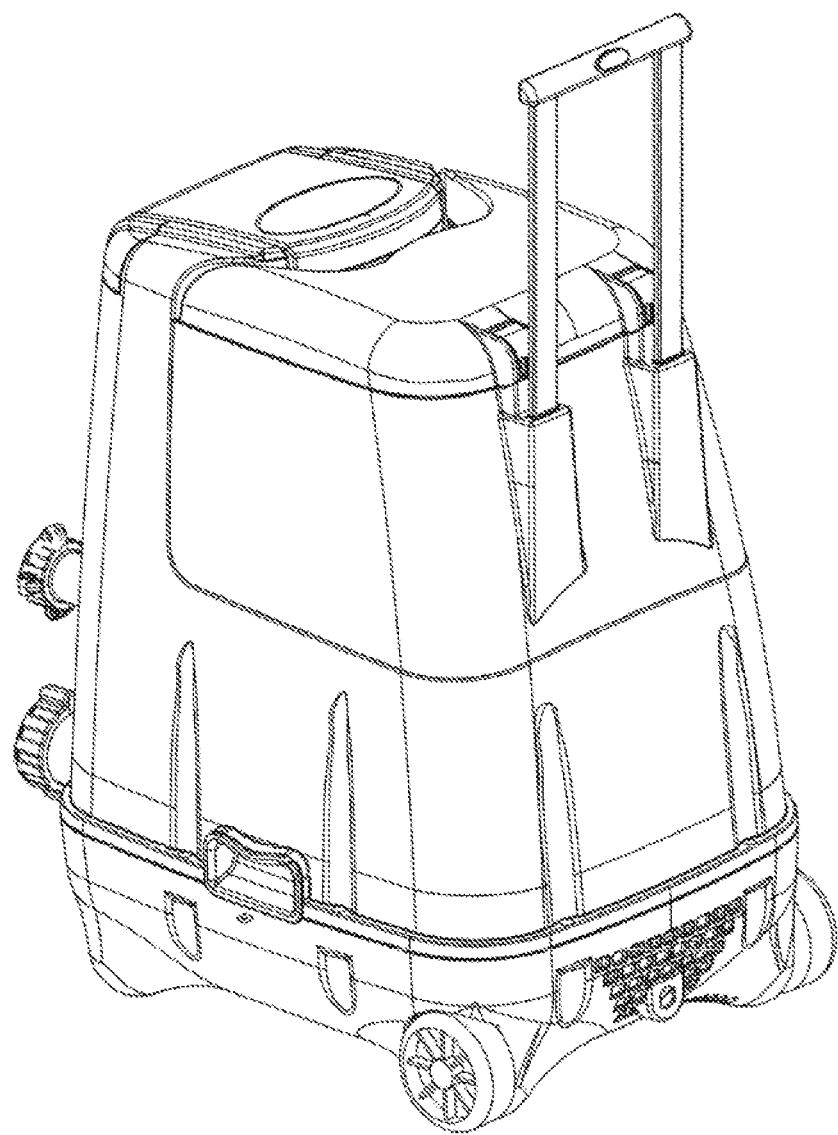
FIG. 15 is a three-dimensional diagram of the pool pump of a fifth embodiment according to the present invention.
Figure 16:
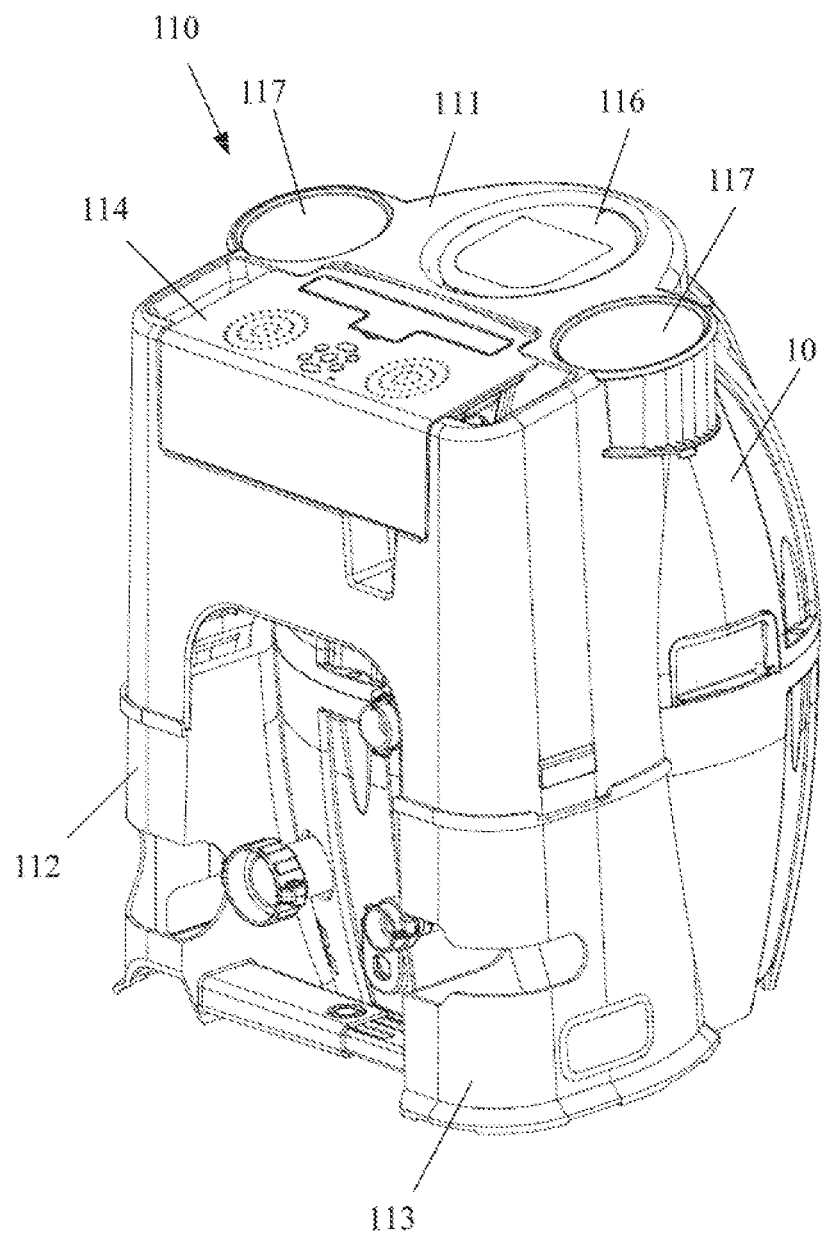
FIG. 16 is a three-dimensional diagram of the pool pump cover mounted integrally with the pool pump as a whole according to the present invention.
Figure 17:
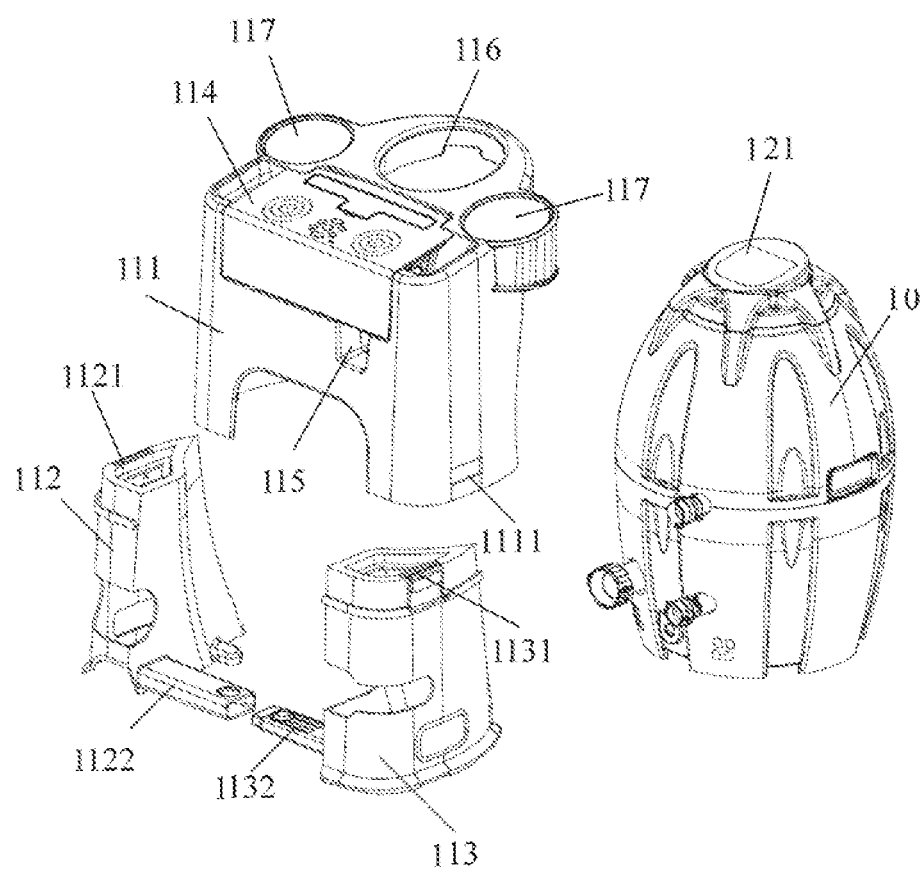
FIG. 17 is an exploded three-dimensional diagram of the pool pump cover and the pool pump provided in FIG. 16.
Figure 18:
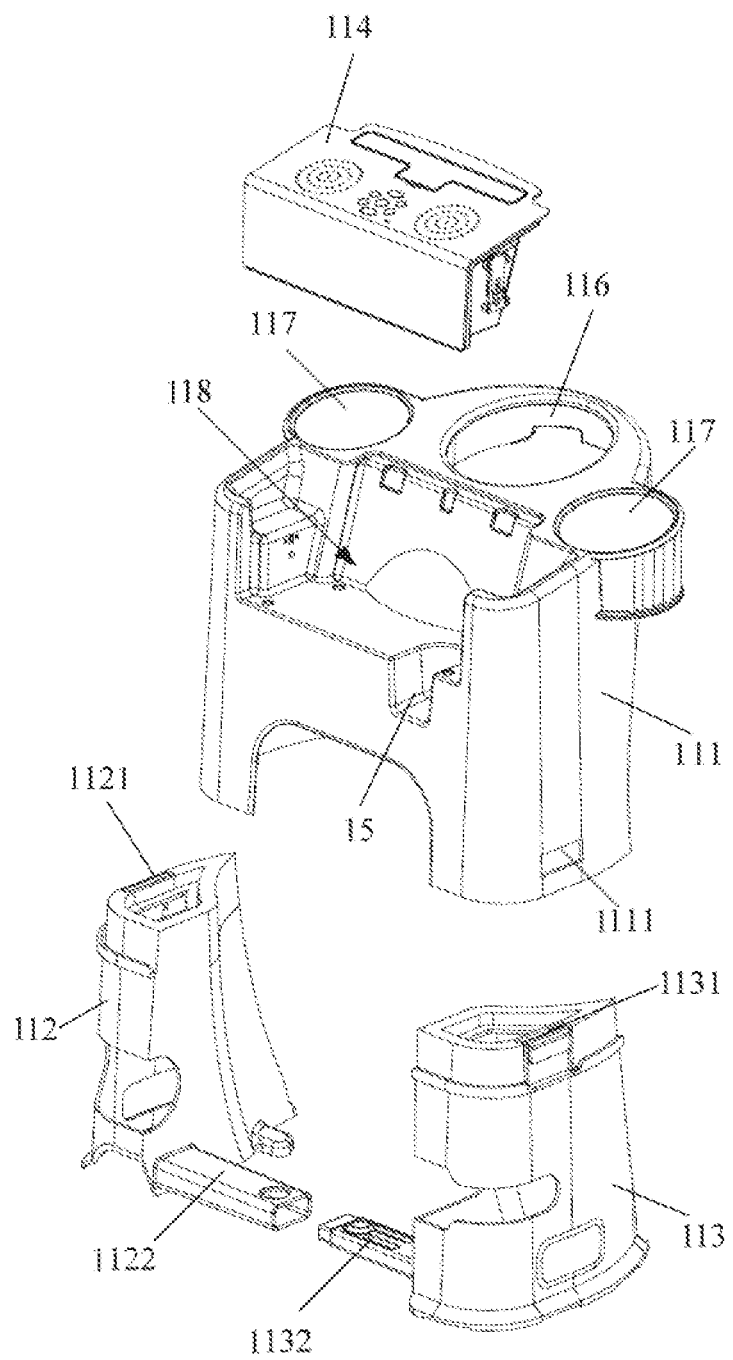
FIG. 18 is an exploded view of the pool pump cover provided in FIG. 16.
Figure 19:
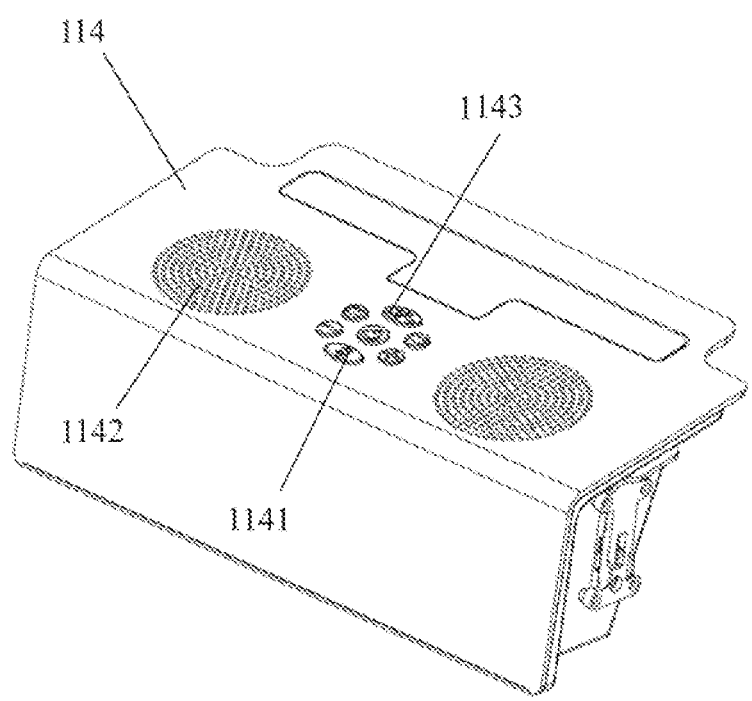
FIG. 19 is a first structural schematic view of functional devices in the pool pump cover provided in FIG. 16.
Figure 20:
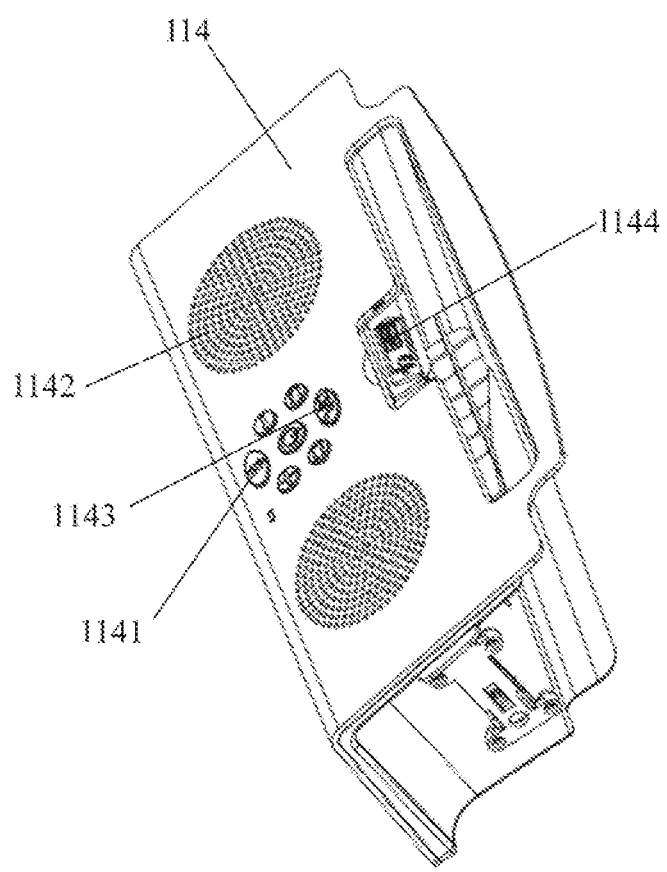
FIG. 20 is a second structural schematic view of functional devices in the pool pump cover provided in FIG. 16.

In order to conveniently move the pool pump, as shown in FIGS. 14 and 15, the pool pump of the present invention may further comprise a pull rod assembly installed at a side edge of the pool pump housing, and a roller assembly installed at a bottom of the pool pump housing. The pull rod assembly and the roller assembly may be used to move the pool pump, which is convenient to use and has good user experience.

As shown in FIG. 14, the present invention provides a pool pump of a fourth embodiment, comprising a pull rod assembly and a roller assembly, said pull rod assembly being arranged at an outer side edge of said housing and being a handle structure, and said roller assembly being arranged at a lower end of said housing and including four roller structures.

As shown in FIG. 15, the present invention provides a pool pump of a fifth embodiment, with a structure similar to that in the fourth embodiment, comprising a pull rod assembly and a roller assembly, said pull rod assembly being arranged at an outer side edge of said housing, and said roller assembly being arranged at a lower end of said housing. The difference lies in that said pull rod is a telescopic structure, said roller assembly comprises two rollers, and the two rollers are arranged on the same side of the pull rod to facilitate pulling the pool pump.

Thus, the pool pump of the present invention has a separate accommodation cavity which can be used to place auxiliary tools; the control panel is arranged in a flippable manner to facilitate the user to observe the operation state of the inflatable pool and make an adjustment in time; and the pull rod assembly and the roller assembly can conveniently move the pool pump body; and is convenient to use. Then, in order to further meet multiple needs of people in the physical therapy process, the present invention discloses a pool pump cover which is detachably connected to a pool pump, comprises functional devices, and can implement communication, playing and electrical charging functions to fully meet multiple needs of people in the use of the pool.

As shown in FIGS. 16-20, the present invention discloses a pool pump cover 110, the pool pump cover 110 is detachably connected to the pool pump 10, the pool pump cover has at least one hollow cavity therein, and said cavity herein is used to at least partially cover the pool pump 10. Moreover, at least one functional device 114 is provided in the cavity of the pool pump cover 110 for implementing at least one of the functions of communication, electrical charging and music play.

Specifically, the functional device 114 is arranged in the first receiving portion 18 of the pool pump cover 110. At least one gap 115 is arranged on the pool pump cover 110 to mount or dismount the functional device 114 from the first receiving portion 118. Here, the functional device 114 may be provided with a Bluetooth device 1141, an audio device 1142 and a USB interface 1144. The functional device 114 has Bluetooth, playing, communication and electrical charging functions. By the Bluetooth device 1141, it may be connected to a communication device (e.g. a mobile phone) or another electronic device having a Bluetooth function to form a communication connection to receive an audio signal of said electronic device or transmit an external audio signal to the electronic device, thereby implementing the Bluetooth function. The audio device 1142 can receive and play back said audio signal to implement the playing function, or extract said external audio signal to implement the communication function. By the USB interface 1144, it can be connected to said electronic device to implement the electrical charging function.

The pool pump cover 110 comprises a cover body 111 and a base, the cover body 111 is mounted on said base, and said cavity is formed between the cover body 111 and said base. Said base is used to fix and protect the cover body 111. Said base preferably comprises a first support portion 112 and a second support portion 113, the first support portion 112 and the second support portion 113 are respectively detachably connected to the two sides of the lower end surface of the cover body 111 through connectors, and the first support portion 112 and the second support portion 113 are of a symmetrically arranged structure. For example, the cover body 111 is arranged to be an L-shaped hollow housing structure, and the first support portion 112 and the second support portion 113 are of a symmetrically arranged hollow support structure. Here, said connector comprises a first snap-fit member 1121, a second snap-fit member (not shown in the figure).

A third snap-fit member 1131 and a fourth snap-fit member 1111. Certainly, in the present invention, said connector is not limited to the above-mentioned fastener or snapping structures, and may also use another structure, which is merely exemplary here.

Further, the first snap-fit member 1121 is arranged at the upper end of the first support portion 112, the second snap-fit member is arranged on one side of the lower end surface of the cover body 111 (not shown in the figure), and the first snap-fit member 1121 is connected to said second snap-fit member correspondingly, so that the cover body 111 is connected to the first support portion 112 as a whole. For the same reasoning, the third snap-fit member 1131 is arranged at the upper end of the second support portion 113, the fourth snap-fit member is arranged on the other side of the lower end surface of the cover body 111, and the third snap-fit member 1131 is connected to said fourth snap-fit member correspondingly so that the cover body 111 is connected to the second support portion 113 as a whole.

Further, a first connecting portion 1122 extending outwards is transversely arranged on the first support portion 112, a second connecting portion 1132 extending outwards is transversely arranged on the second support portion 113, and the first connecting portion 1122 is detachably connected to the second connecting portion 1132, so that the first support portion 112 is connect to the second support portion 113 as a whole.

At least one second receiving portion is arranged in the cavity of the pool pump cover 110, and used to place articles. Said second receiving portion is preferably a cup holder 117, so as to facilitate the user to protect articles to implement multiple functions of the pool.

Furthermore, the cover body 111 is further provided with a port 116, and the control panel 121 of the pool pump 10 is inserted in the port 116. The whole pool pump cover is preferably made of a plastic material, is convenient to manufacture, and has an easily formed structure.

Figure 21:
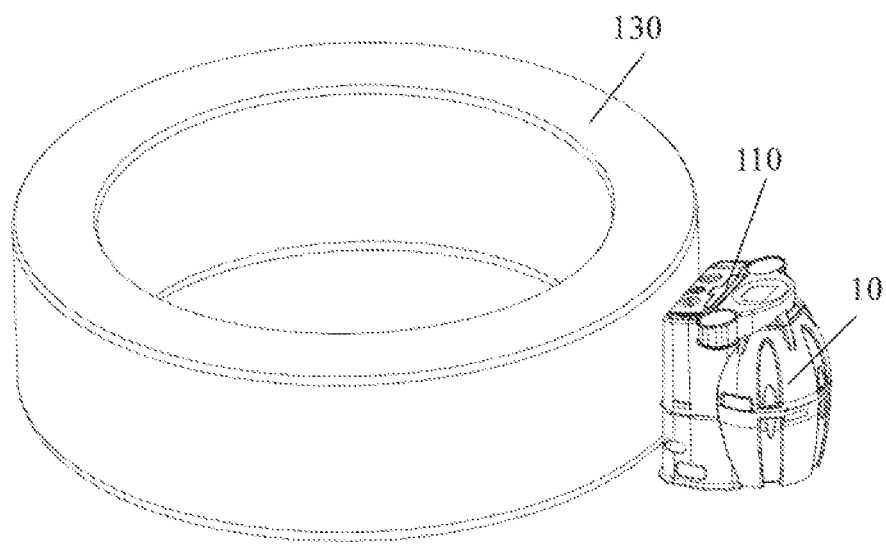
FIG. 21 is a pattern diagram of the pool pump cover provided in FIG. 16 applied to an inflatable pool.

As the pattern diagram of the pool pump cover applied to an inflatable pool shown in FIG. 21, the pool pump 10 is mounted around a pool body 130, and the pool pump cover 110 is mounted on the pool pump 10.

In summary, in the pool pump cover of the present invention, the receiving device and devices are arranged in the same cover body, which is simple in structure and convenient for installation and can meet the multiple needs of people in SPA. Moreover, arranging the cover body on the pool pump body can effectively save space to facilitate the use. Finally, the present invention further discloses a pool control system for a massage pool unit including a pool pump and an inflatable pool. The pool pump 10 is in communication with the inflatable pool 20 through the pool control system 40, i.e. the pool control system 40 transmits various signals to the massage pool unit of the inflatable pool 20.

Figure 3:
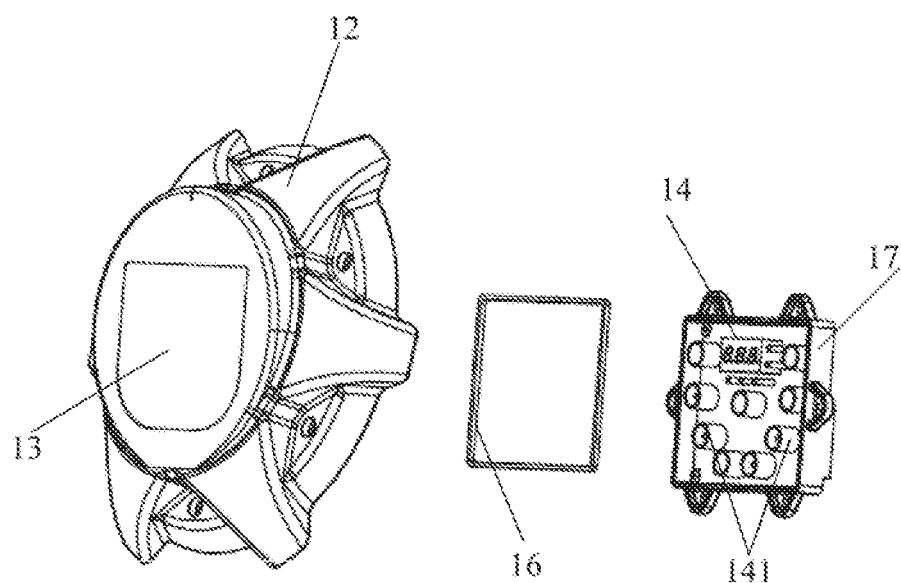
FIG. 3 is a first exploded schematic diagram of an end cover of a housing and a circuit board of the pool pump provided in FIG. 1.
Figure 4:
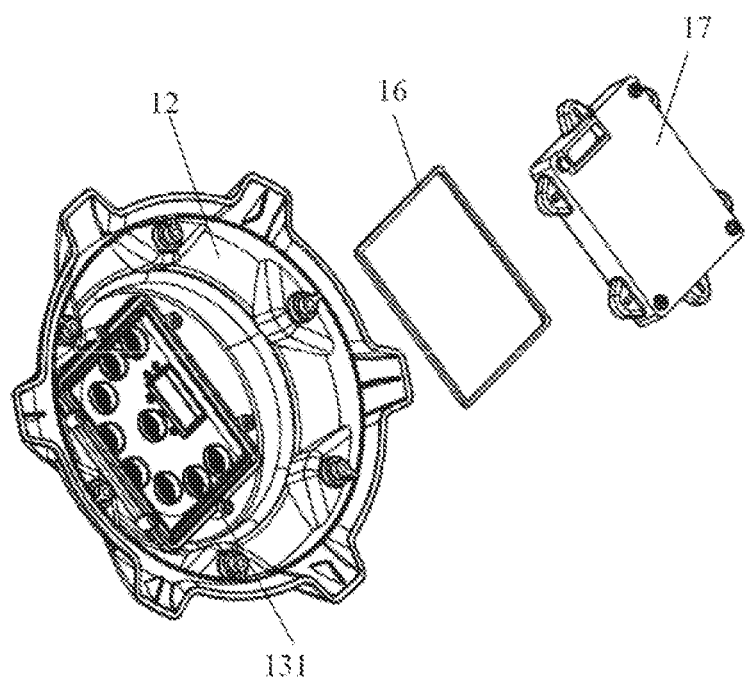
FIG. 4 is a second exploded schematic diagram of an end cover of a housing and a circuit board of the pool pump provided in FIG. 1.
Figure 5:
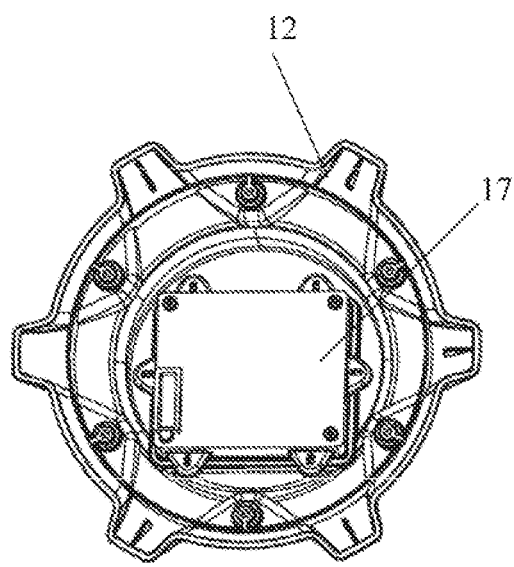
FIG. 5 is an assembly drawing of an end cover of a housing and a circuit board of the pool pump provided in FIG. 1.
Figure 6:
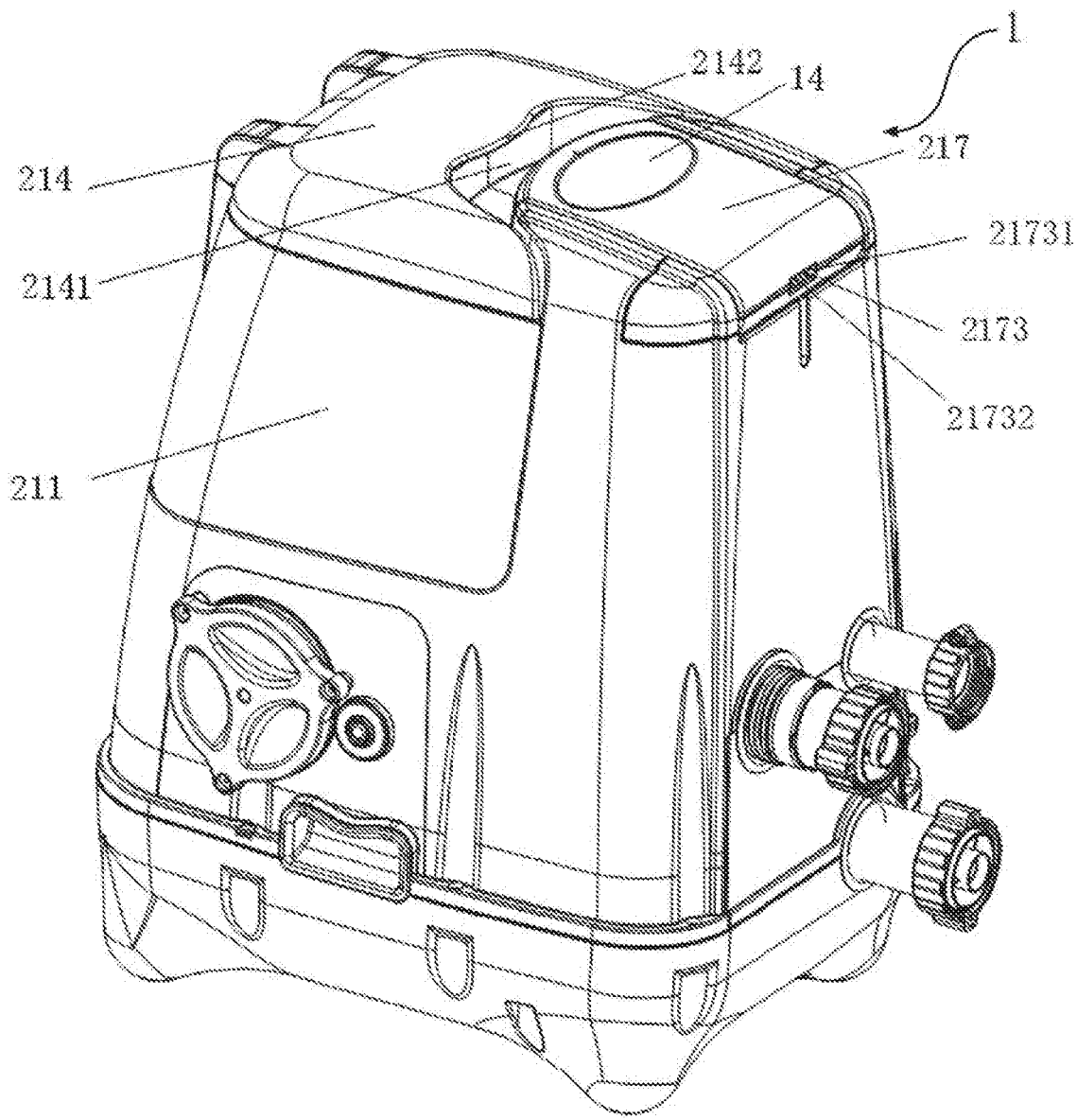
FIG. 6 is a structural schematic view of a pool pump according to a second embodiment of the present invention.
Figure 7:
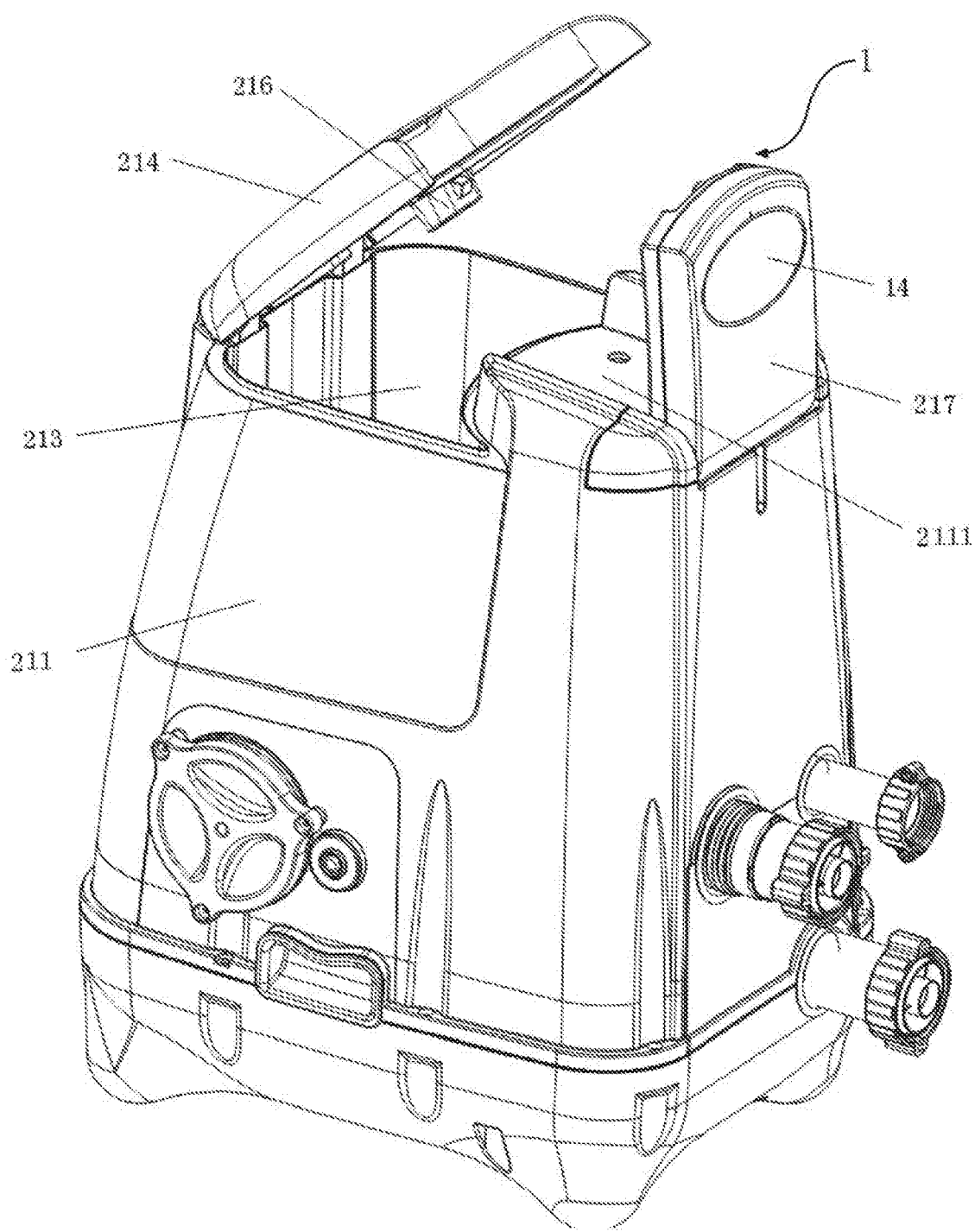
FIG. 7 is a structural schematic view of the pool pump provided in FIG. 6, with the cover body opened and the control panel turned over.
Figure 8:
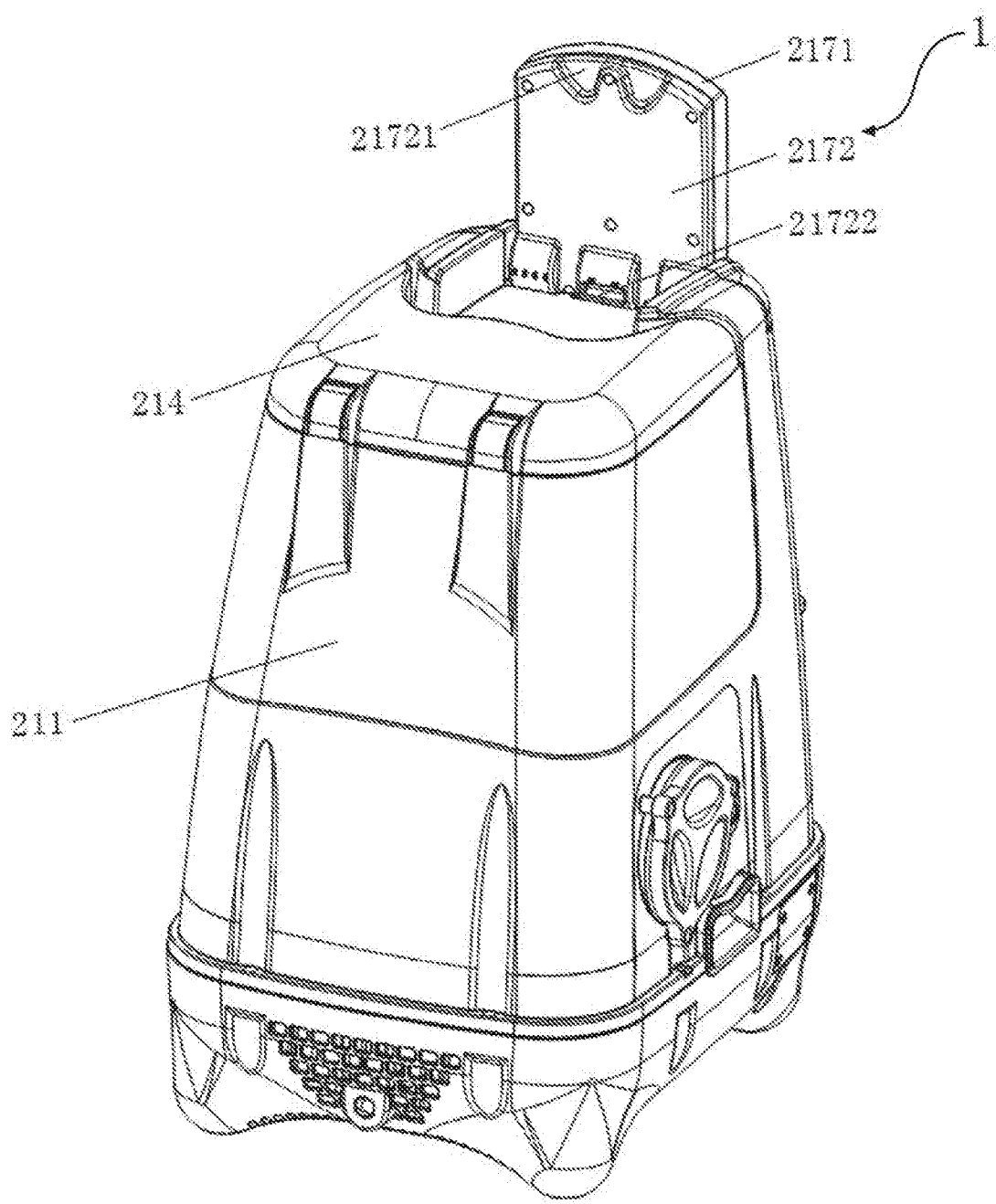
FIG. 8 is a structural schematic view of the pool pump provided in FIG. 6, with the control panel turned over.
Figure 9:
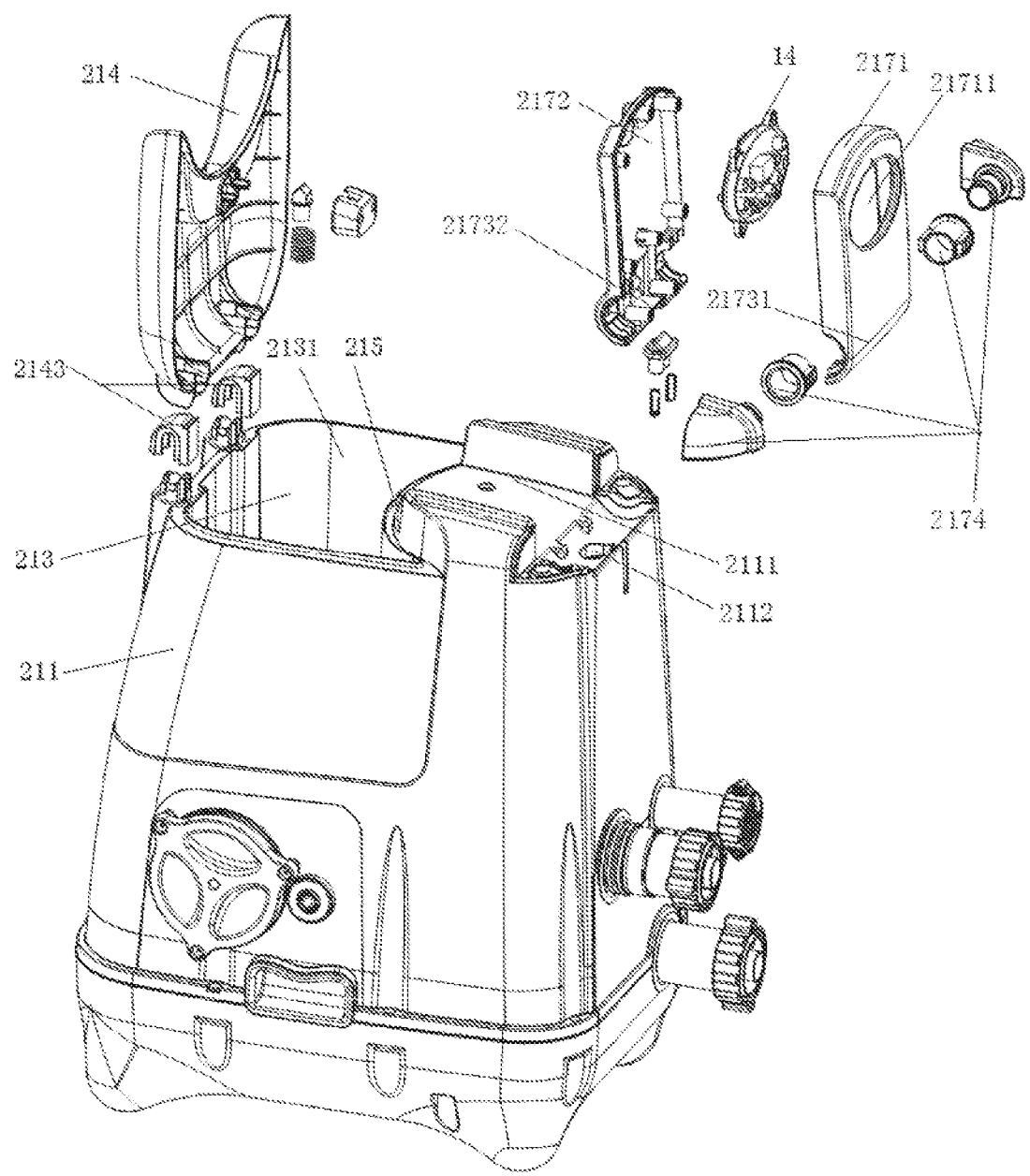
FIG. 9 is a structural exploded view of the pool pump provided in FIG. 6.
Figure 10:
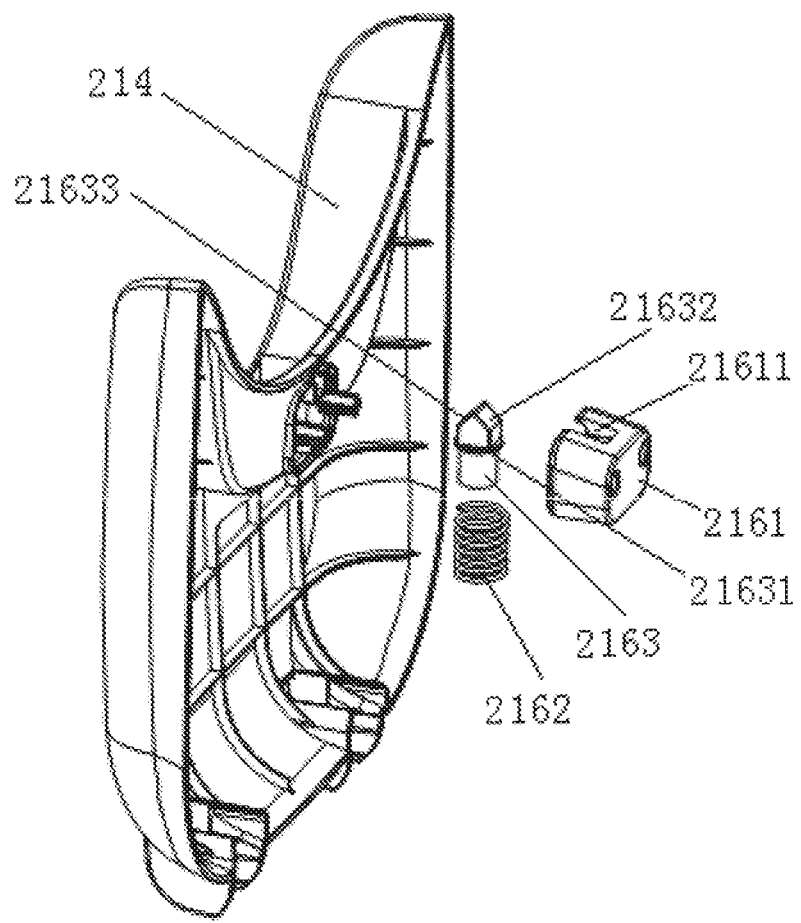
FIG. 10 is a structural exploded view of the cover body provided in FIG. 6.
Figure 11:
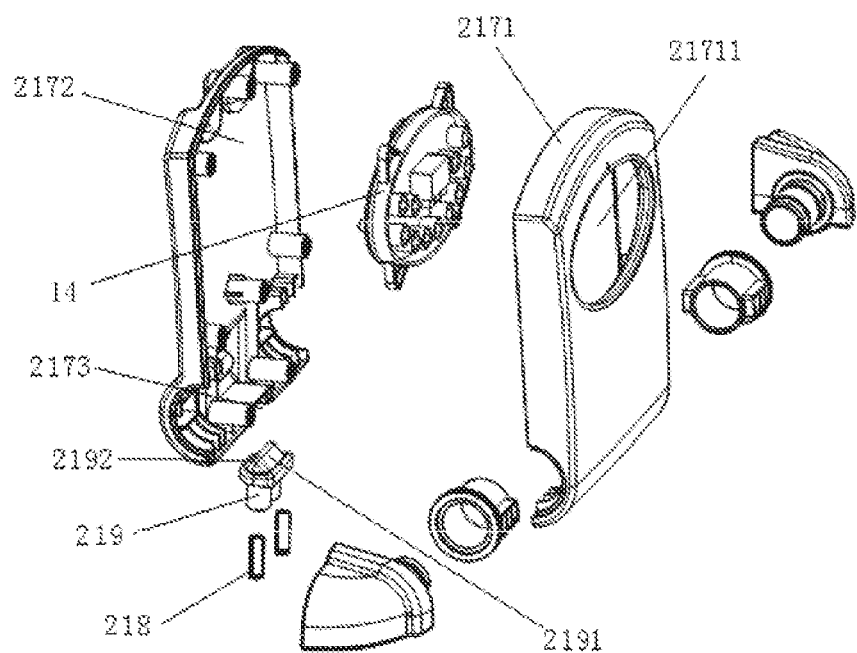
FIG. 11 is a structural exploded view of the control box provided in FIG. 6.
Figure 22:
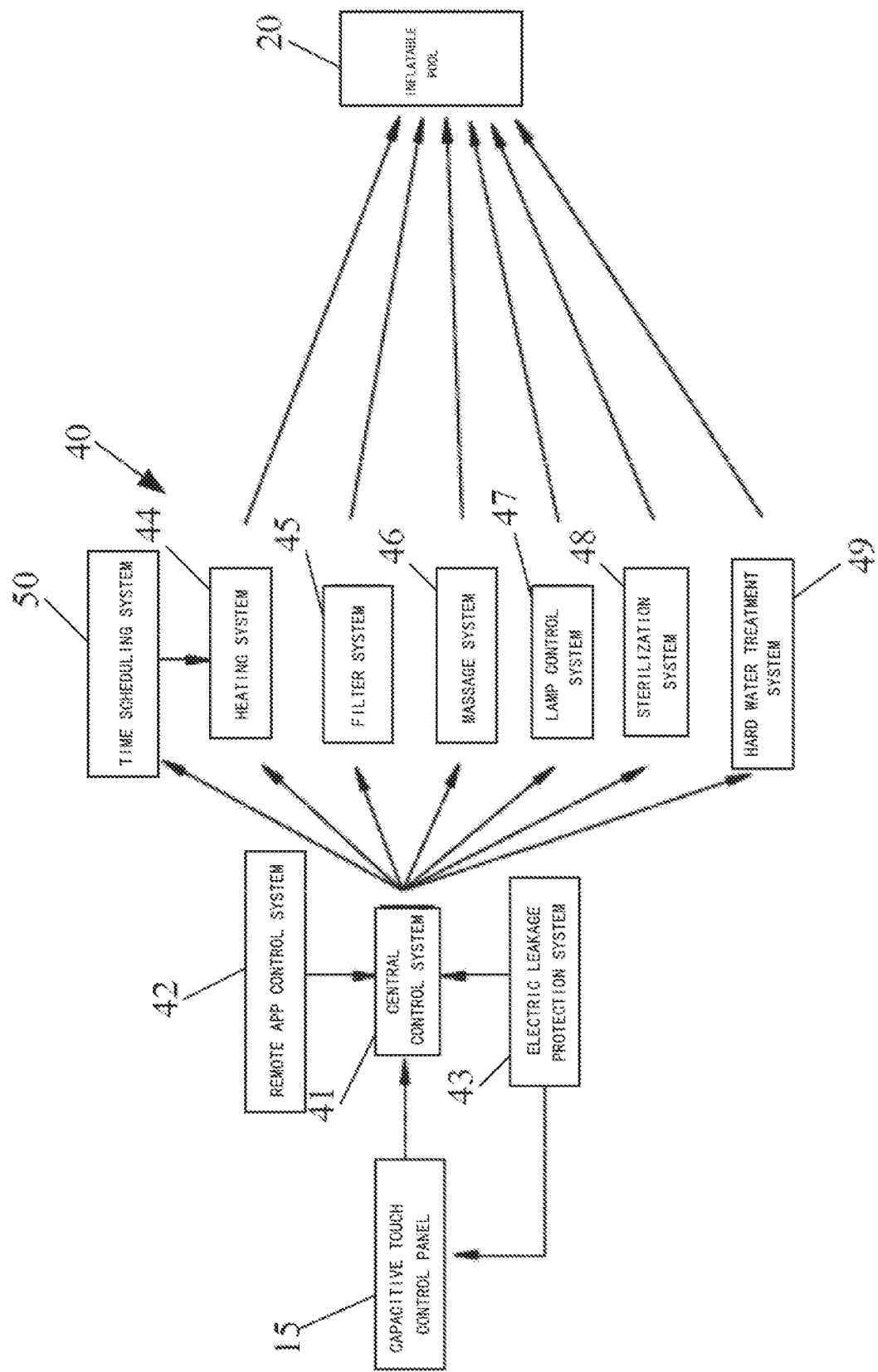
FIG. 22 is a schematic view of the pool control system of the first embodiment according to the present invention.
Figure 23:
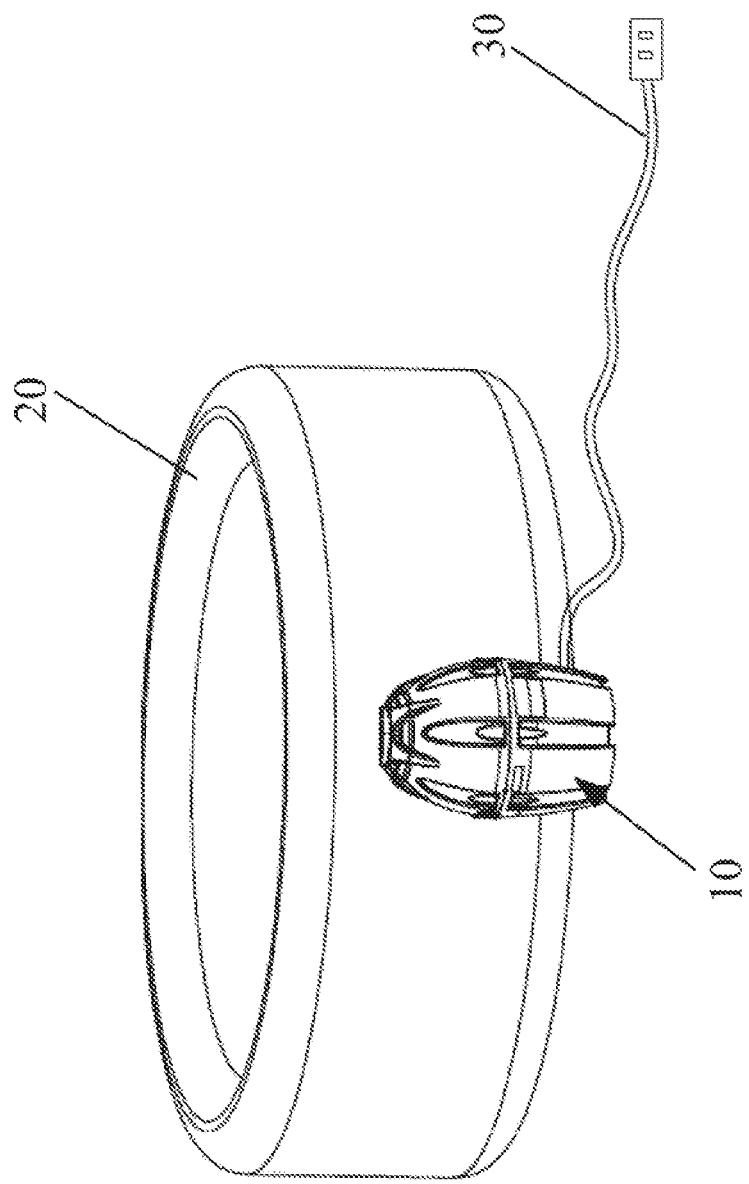
FIG. 23 is a structural schematic view of the pool control system provided in FIG. 22 applied to an inflatable pool.

A pool control system of an embodiment as shown in FIGS. 22 and 23, comprising an intelligent controller which is electrically connected to the massage pool unit and can receive a usage operation to drive the pool pump 10 so as to drive the inflatable pool 20 to generate a plurality of water circulation nodes, wherein the intelligent controller comprises a capacitive touch control panel 15, a central control system 41, and several functional devices connected to the central control system 41, and the capacitive touch control panel 15 consists of a control panel 13 and said control unit 14 (as shown in FIGS. 3 and 4); and wherein the control unit 14 is connected to the central control system 41, which may be two separate units electrically connected with each other or may be integrated as an independent system unit. Said functional device comprises a heating system 44, a filter system 45, a massage system 46, a lamp control system 47, a sterilization system 48 and a hard water treatment system 49, and signals from the central control system 41 are transmitted in one way to each functional device.

The pool control system 40 further comprises a remote APP control system 42 and an electric leakage protection system 43. The remote APP control system 42 is connected to the central control system 41, the electric leakage protection system 43 is connected to the central control system 41, the central control system 41 is connected to the capacitive touch control panel 15 of the pool pump 10, and the electric leakage protection system 43 is connected to the capacitive touch control panel 15 of the pool pump 10. The signal from the electric leakage protection system 43 is transmitted in one way to the capacitive touch control panel 15. Furthermore, in this embodiment, the electric leakage protection system 43 may be an external electric leakage protection device 30 which is connected to a power source as a whole.

Specifically, the pool control system 40 further comprises a time scheduling system 50, and the time scheduling system 50 is connected to the central control system 41 and the heating system 44. The signal from the central control system 41 is transmitted to the time scheduling system 50, and then the signal from the time scheduling system 50 is transmitted to the heating system 44.

During the use, the capacitive touch control panel 15 receives an external input signal, and transmits the signal to the central control system 41, and the central control system 41 can simultaneously receive the signals from the remote APP control system 42 and the electric leakage protection system 43. Then the central control system 41 respectively transmits the signals to a time scheduling system 50, a heating system 44, a filter system 45, a massage system 46, a lamp control system 47, a sterilization system 48 and a hard water treatment system 48, and the functional devices finally transfer the signals to the pool 20 to make a corresponding feedback. The electric leakage protection system 43 simultaneously feeds back the information to the capacitive touch control panel 15.

Figure 24:
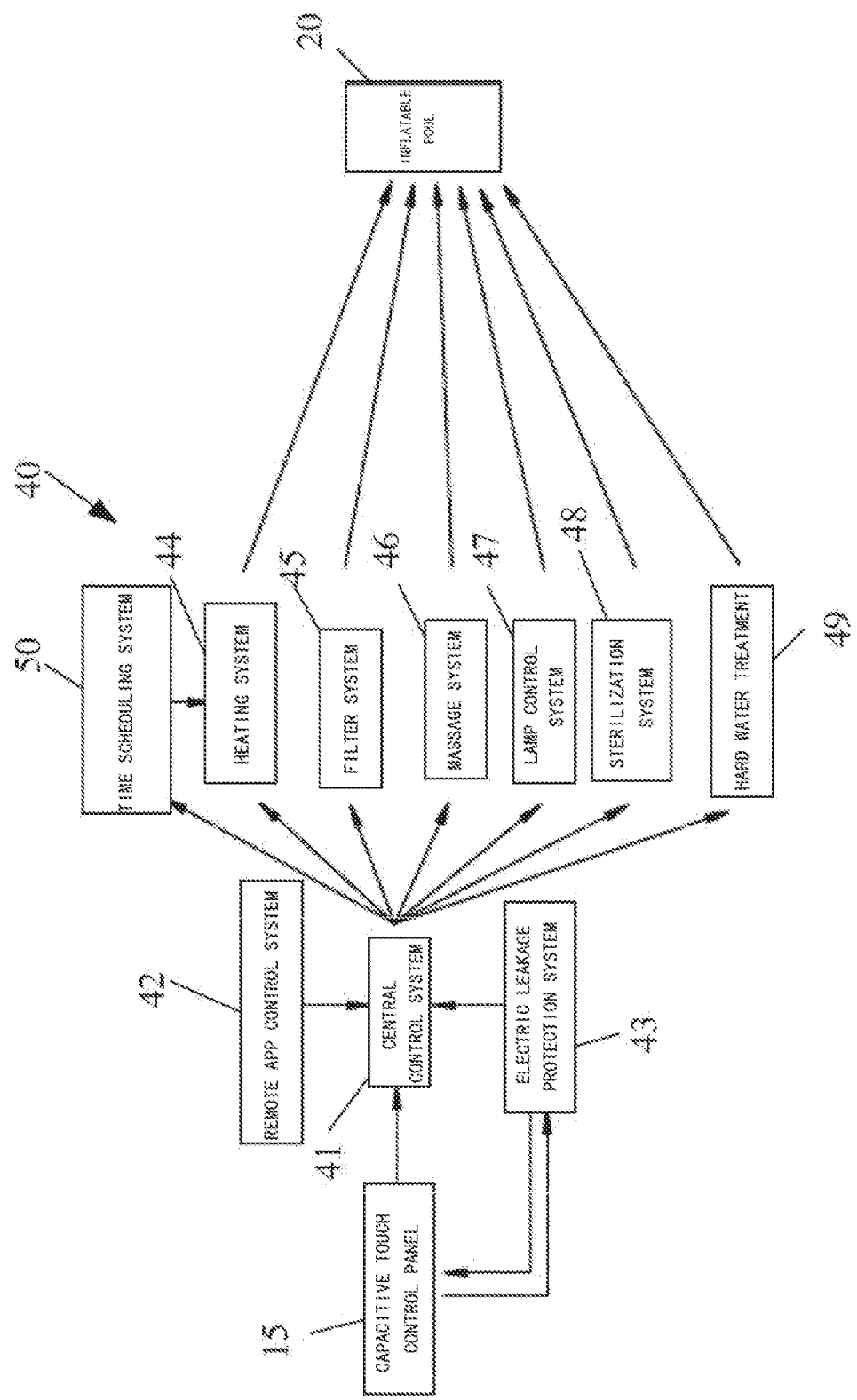
FIG. 24 is a schematic view of the pool control system of the second embodiment according to the present invention.

The present invention further discloses a pool control system of another embodiment, as shown in FIG. 24, and the difference of this embodiment from the above-mentioned embodiments lies in that, in the pool control system 40, two-way transmission of information can be implemented between the electric leakage protection system and the capacitive control panel. Said remote APP control, system is electrically connected to said central control system and configured for remotely receiving said usage operation, said electric leakage protection system is electrically connected to said central control system and configured for feedback of an electric leakage signal, and said central control system interrupts operation of said functional device according to said electric leakage signal, thereby implementing two-way transmission of information between the electric leakage protection system 43 and the capacitive touch control panel 15.

Furthermore, as shown in FIG. 25, in this embodiment, the electric leakage protection system of the pool control system of the present embodiment is built-in the pool pump, so that the whole structure is more simplified.

Thus, the pool control system of the present invention uses a time scheduling control function to achieve the power saving and energy saving purpose. Moreover, the detection using the electric leakage protection system can enhance the safety in the use of pool pump.

While the particular embodiments of the present invention have been described, a person skilled in the art should understand that these are merely illustrative, and that the scope of protection of the present invention is defined by the appended claims. Various alterations or modifications can be made by a person skilled in the art to these embodiments without departing from the principle and substance of the present invention; however, these alterations and modifications all fall within the scope of protection of the invention.

The invention claimed is:

1. A pool pump for connecting a pool, comprising:
  a control panel for touch control;
  an end cover having a plurality of protruding bars extending from the control panel and a connecting structure, the end cover being integrated with the control cover as an integrated piece forming a sealed structure completely without a gap and with a flat outer surface; and
  a pump body for connecting to the integrated piece of the control panel and the end cover via the connecting structure, and for accommodating pipeline and a motor for pumping water of a pool according to user instructions applied on the control panel, wherein the pump body has a plurality of extending bars aligning with the plurality of protruding bars when the integrated piece of the control panel and the end cover is fixed to the pump body.

2. The pool pump of claim 1, wherein the connecting structure comprises a plurality of screw units for connecting the integrated piece of the control panel and the end cover via corresponding screws.

3. The pool pump of claim 1, wherein a plurality of recesses are formed on an inner side surface of the control panel, a plurality of electrically conductive components are disposed in a control unit stored below the control panel, and the electrically conductive components are received in the recesses, and wherein the electrically conductive component is a sensing spring, one end of the sensing spring is connected to the respective recess, and the other end of said sensing spring is connected to the control unit, so that the control panel forms the capacitive touch control.

4. The pool pump of claim 1, wherein the integrated piece of the control panel and the end cover has at least one accommodation cavity, the control panel is disposed in a flippable manner on the integrated piece of the control panel and the end cover, the control panel is in a leveled position and at least one preset angle position is relative to the end cover, the accommodation cavity comprises an opening, and at least one cover body is disposed in a flippable manner on the integrated piece of the control panel and the end cover through at least one linkage and is located at the front side, the rear side or both sides of the opening.

5. A pool pump, comprising:
  a control panel for a capacitive touch control;
  an end cover, integrated with the control cover as an integrated piece forming a sealed structure completely without a gap and with a flat outer surface;
  a pump body for connecting to the integrated piece of the control panel and the end cover and for accommodating pipeline and a motor for pumping water of a pool according to user instructions applied on the control panel; and
  a package housing fixedly connected to a cavity below the end cover forming an enclosed body for containing circuits for processing touch operations applied on the control panel;
  wherein a plurality of recesses are formed on an inner side surface of the control panel, a plurality of electrically conductive components are disposed in a control unit stored below the control panel, and the electrically conductive components are received in the recesses, and
  wherein the electrically conductive component is a sensing spring, located in the package housing, one end of the sensing spring is connected to the respective recess, and the other end of said sensing spring is connected to the control unit, so that the control panel forms the capacitive touch control.

6. The pool pump of claim 5, wherein the circuits storing in the package housing are sealed inside an accommodation space below the integrated piece of the control panel and the end cover to prevent water from entering therein to damage the circuits.

7. The pool pump of claim 5, further comprising a seal ring at a junction to a cover attaching to the integrated piece of the control panel and the end cover for containing circuits for processing touch operations.

8. The pool pump of claim 7, wherein the cover has connection terminals for detachably connecting to the motor of the pump body.

9. The pool pump of claim 5, wherein the integrated piece of the control panel and the end cover forms a dorm shape.

10. The pool pump of claim 5, wherein the integrated piece of the control panel and the end cover and the pump body are two separate pieces of components, water from the pool only flows in the pump body and does not touch the integrated piece of the control panel and the end cover.

11. The pool pump of claim 5, wherein the integrated piece of the control panel and the end cover has at least one accommodation cavity, the control panel is disposed in a flippable manner on the integrated piece of the control panel and the end cover the control panel is in a leveled position and at least one preset angle position is relative to the end cover the accommodation cavity comprises an opening, and at least one cover body is disposed in a flippable manner on the integrated piece of the control panel and the end cover through at least one linkage and is located at the front side, the rear side or both sides of the opening.

12. The pool pump of claim 5, wherein the control panel comprises a first housing cover and a second housing cover and a control unit is accommodated between the first housing cover and the second housing cover.

13. The pool pump of claim 5, wherein the control panel has a display window, and at least one display component is disposed below the control panel and exposed through the display window.

14. The pool pump of claim 5, wherein the integrated piece of the control panel and the end cover has at least one notch and an accommodation groove, the notch is located at an edge of one end of the integrated piece of the control panel and the end cover, and said accommodation groove is located at an edge of the other end of the integrated piece of the control panel and the end cover.

15. The pool pump of claim 5, wherein said control panel has a damping slot located at a lower bottom of said control panel, a linkage rod disposed on the integrated piece of the control panel and the end cover; said linkage rod is accommodated in said accommodation groove when the control panel is in said horizontal position, said linkage rod is engaged with said damping slot when the control panel is in said preset angle position.

16. The pool pump of claim 5, wherein said end cover has a recessed portion, and said control panel is adhered to said end cover when said control panel is in said horizontal position and is accommodated in said recessed portion.

17. The pool pump of claim 5, further comprising a pull rod assembly installed at a side edge of the pump body; a roller assembly installed at the bottom of said pump body.

18. The pool pump of claim 5, further comprising a pool pump cover detachably connected to the pump body, the pool pump cover having a hollow cavity for placing at least one functional device for implementing at least one of the functions of communication, electrical charging and music play.

19. The pool pump of claim 18, wherein the pool pump cover is a part of the integrated piece of the control panel and the end cover.

20. The pool pump of claim 18, wherein the functional device is configured to have a Bluetooth device to form a communication connection with at least one electronic device so as to receive an audio signal from said electronic device or transmit an external audio signal to said electronic device, an audio device is disposed on said functional device to receive and play said audio signal and extract said external audio signal.

21. The pool pump of claim 18, wherein the integrated piece of the control panel and the end cover also contains an intelligent controller electrically connected to a massage pool unit placed in the pool, the intelligent controller being configured to receive a usage operation on the control panel to drive the pool pump so that the pool generates multiple water circulation modes.

22. The pool pump of claim 18, wherein said functional devices comprises a heating system, a filter system, a massage system, a lamp control system, a sterilization system and a hard water treatment system.

23. The pool pump of claim 18, further comprising a remote APP control system and an electric leakage protection system, said remote APP control system is electrically connected to a central control system and configured to remotely receive said usage operation, said electric leakage protection system, is electrically connected to said central control system and configured for feedback of an electric leakage signal, and said central control system interrupts operation of said functional device according to said electric leakage signal.

* * * * *